US012470859B1

(12) United States Patent
Wheeler et al.

(10) Patent No.: US 12,470,859 B1
(45) Date of Patent: Nov. 11, 2025

(54) ADJUSTABLE EAR WORN APPARATUS

(71) Applicant: Aurenar, Inc., St. Louis, MO (US)

(72) Inventors: Jesse Wheeler, St. Louis, MO (US); Eric Leuthardt, St. Louis, MO (US); Jenna Gorlewicz, St. Louis, MO (US); Joe St Cyr, Hollis, NH (US); Jim Best, Hollis, NH (US); Chris Labak, Hollis, NH (US); Robert McCaffrey, Hollis, NH (US); Garrett Casey, Hollis, NH (US); Nick Vallo, Hollis, NH (US); Jay Goodell, Hollis, NH (US); Stan Polipas, Hollis, NH (US)

(73) Assignee: Aurenar, Inc., St. Louis, MO (US)

( * ) Notice: Subject to any disclaimer, the term of this patent is extended or adjusted under 35 U.S.C. 154(b) by 0 days.

(21) Appl. No.: 19/186,253

(22) Filed: Apr. 22, 2025

Related U.S. Application Data

(60) Provisional application No. 63/744,537, filed on Jan. 13, 2025, provisional application No. 63/713,773, filed on Oct. 30, 2024.

(51) Int. Cl.
*H04R 1/10* (2006.01)

(52) U.S. Cl.
CPC ......... *H04R 1/1016* (2013.01); *H04R 1/1075* (2013.01)

(58) Field of Classification Search
CPC .... H04R 25/48; H04R 1/1016; H04R 1/1091; H04R 1/1075; H04R 1/2857; H04R 1/2853; H04R 2460/17; H04R 1/1025; H04R 1/1041; H04R 1/06; H04R 9/025; H04R 9/06; H04R 2209/022; H04R 2460/09; H04R 1/10; H04R 5/033; H04R 2201/103; H04R 1/24; H04R 1/105; H04R 1/08; H04R 1/028; H04R 1/1066; H04R 1/1083; H04R 2460/01; H04R 1/1058; H04R 2420/07; H04R 2201/107; H04R 1/345; G01R 33/07; G01R 33/283; G01D 5/145; H04B 5/00; A61F 11/10; A61F 11/12; A61F 11/08; A61F 11/085; A61B 5/055; A61B 5/7465; G16H 80/00
See application file for complete search history.

(56) References Cited

U.S. PATENT DOCUMENTS

| | | | | |
|---|---|---|---|---|
| 2011/0103636 A1* | 5/2011 | Pelland .................. | H04R 1/105 381/380 |
| 2024/0114283 A1* | 4/2024 | Wang ..................... | H04R 1/105 |

* cited by examiner

*Primary Examiner* — Carolyn R Edwards
*Assistant Examiner* — Julie X Dang
(74) *Attorney, Agent, or Firm* — Seager, Tufte & Wickhem LLP

(57) ABSTRACT

An example wearable device for placement relative to an ear includes a housing; a first extending structure; a second extending structure, the first and second extending structures are separated by an adjustable distance; a carriage coupled to the second extending structure and being at least partially disposed within the housing, the carriage being configured to move longitudinally along the housing and an adjustment mechanism configured to impart a force to cause longitudinal movement of the carriage to adjust the adjustable distance.

20 Claims, 12 Drawing Sheets

ADJUSTABLE EAR WORN APPARATUS

CROSS REFERENCE TO RELATED APPLICATIONS

The present application claims the benefit of and priority to U.S. Provisional Patent Application No. 63/698,299, filed Sep. 24, 2024, titled ANTI-INFLAMMATORY AURICULAR VAGAL NERVE STIMULATION, and U.S. Provisional Patent Application No. 63/713,773, filed Oct. 30, 2024, titled AURICULAR VAGAL NERVE STIMULATION TO MITIGATE INFLAMMATORY COMPLICATIONS FOR BIOACTIVE AGENTS, and U.S. Provisional Patent Application No. 63/744,537, filed Jan. 13, 2025, titled WEARABLE DEVICES WITH ADJUSTMENT MECHANISMS, the disclosures of which are incorporated herein by reference.

BACKGROUND

Wearable devices, particularly those designed to be disposed in or around the ear, have gained significant popularity in recent years. These devices, such as earbuds, are small, portable, and often wireless, providing users with hands-free access to audio, communication, and various smart functions. Earbuds can connect to smartphones, computers, and other devices via BLUETOOTH or other wireless communication protocols, offering features like sound (e.g., music) delivery, noise cancellation, voice assistants, fitness tracking, etc. For instance, their compact size and comfort make them ideal for daily use, whether for listening to music, taking calls, or tracking physical activity.

OVERVIEW

A first illustrative and non-limiting example takes the form of a wearable device adapted for placement relative to an ear of a user, comprising a housing containing, electronics and a power source; wherein the housing comprises a lower container and an upper lid, a first extending structure having a first end at the housing and a second end apart from the housing, the first extending structure having a first length, the second end configured for contacting the posterior edge of the crus and/or antitragus; a first anchor arm extending laterally from the first extending structure and carrying an anchor element thereon, the anchor element configured for positioning beneath a tragus of the ear of the user to thereby support positioning of the device; a second extending structure comprising a first end at the housing and a second end apart from the housing, wherein the first and second extending structures are separated by an adjustable distance; a carriage coupled to the first end of the second extending structure and being at least partially disposed within the housing, wherein the carriage is configured to move longitudinally along a length of the housing; and an adjustment mechanism coupled to the carriage, wherein the adjustment mechanism is configured to impart a force to cause longitudinal movement of the carriage to adjust the adjustable distance.

Additionally, or alternatively, wherein the adjustment mechanism is an individual adjustment mechanism that is configured to be actuated by contact from one or more digits on an individual hand of a person.

Additionally, or alternatively, wherein: the adjustment mechanism is located at a first end of the housing; and a portion of the adjustment mechanisms extends a distance from the first end of the housing and a portion of the adjustment mechanism is located inside of the housing.

Additionally, or alternatively, wherein the second extending structure is configured to abut a first portion of an ear to create an opposing force to the first extending structure which is configured to abut a second portion of the ear, wherein the first portion of the ear is the inferior crus, the antihelix, or both, and wherein the second portion of the ear is the antitragus.

Additionally, or alternatively, wherein the adjustment mechanism is integral with the carriage.

Additionally, or alternatively, wherein the adjustment mechanism is located on a first end of the carriage, and wherein the adjustment mechanism comprises a protrusion extending radially from the carriage.

Additionally, or alternatively, wherein a speaker, a sensor, or both the speaker and the sensor are positioned on the first extending structure or the second extending structure.

Additionally, or alternatively, wherein the adjustment mechanism comprises a separate component that is coupled to the carriage.

Additionally, or alternatively, wherein adjustment mechanism comprises a lever or a wheel.

Additionally, or alternatively, wherein the adjustment mechanism further comprises a rotatable adjustment mechanism including an annulus, wherein the rotatable adjustment mechanism is configured to rotate about the annulus relative to the carriage, the housing, or both the carriage and the housing.

Additionally, or alternatively, wherein: the housing includes a slot extending through the first end of the housing; the rotatable adjustment mechanism comprises: a lever extending laterally therefrom through the slot to a position outside of the housing; and teeth disposed along at least a portion of a periphery of the rotatable adjustment mechanism that is located in the housing; and the carriage includes corresponding teeth that are configured to interface with the teeth to impart a force on the carriage to cause the longitudinal movement of the carriage responsive to rotation of the lever of the adjustment mechanism.

Additionally, or alternatively, wherein the carriage includes an elongated longitudinal slot extending along a portion of the length of the carriage; and the lower lid includes a peg configured to extend into the elongated longitudinal slot.

Additionally, or alternatively, wherein the housing includes a slot extending through the first end of the housing; and the rotatable adjustment mechanism comprises a wheel with a toothed surface along at least a portion of a periphery of the rotatable adjustment mechanism and a curvilinear slot extending within a portion of the wheel.

Another illustrative and non-limiting example takes the form of a wearable device adapted for placement relative to an ear of a user, comprising: a housing containing, electronics and a power source, the housing comprises a lower container and an upper lid defining a cavity therebetween; a first extending structure having a first end at the housing and a second end apart from the housing, the first extending structure having a first length, the second end configured for contacting the posterior edge of the crus and/or antitragus; a first anchor arm extending laterally from the first extending structure and carrying an anchor element thereon, the anchor element configured for positioning beneath a tragus of the ear of the user to thereby support positioning of the device; a second extending structure comprising a first end at the housing and a second end apart from the housing, wherein the first and second extending structures are separated by an adjustable distance; a carriage coupled to the first end of the second extending structure and being at least partially disposed within the cavity of the housing, wherein the carriage is configured to translate longitudinally along a length of the housing; an adjustment mechanism coupled to the carriage, wherein the adjustment mechanism is an individual adjustment mechanism that is configured to impart a force to cause longitudinal translation of the carriage to adjust the adjustable distance; and a speaker positioned on the first extending structure or the second extending structure.

Additionally, or alternatively, wherein the adjustment mechanism comprises a fixed protrusion extending radially from the carriage or a rotatable adjustment mechanism coupled to an end of the carriage; or the carriage, the housing, or both the carriage and the housing include detents configured to predispose the carriage to one or more longitudinal positions along a length of travel of the carriage.

Additionally, or alternatively, wherein the first extending structure is located on a first side of the housing, a second side of the housing opposite the first side comprises at least one control button or switch for controlling activity of the electronics, and wherein the second extending structure is configured to abut a first portion of an ear to create an opposing force to the first extending structure which is configured to abut a second portion of the ear, wherein the first portion of the ear is the inferior crus, the antihelix, or both, and wherein the second portion of the ear is the antitragus.

Additionally, or alternatively, wherein a sensor is positioned on the first extending structure or the second extending structure.

Another illustrative and non-limiting example takes the form of a method of positioning a wearable device in an ear of a user, the wearable device comprising a housing and a first extending structure carrying thereon an anchor arm adapted for positioning in the auditory canal of a user, a second extending structure spaced from the first extending structure, a carriage coupled to the second extending structure, and an adjustment mechanism disposed at a first end of the housing and being configured to adjust a distance between the second extending structure and the first extending structure by imparting a force on the carriage to cause longitudinal movement of the carriage, the method comprising: placing the anchor arm in the auditory canal or at least partially beneath the tragus; and actuating the adjustment mechanisms to vary an adjustable distance between the first extending structure and the second extending structure until the second extending structure abuts the helix, the antihelix, the inferior crus, or any combination thereof.

Additionally, or alternatively, wherein actuating the adjustment mechanism further comprises actuating the adjustment mechanism subsequent to placing the anchor arm in the auditory canal or at least partially beneath the tragus.

Additionally, or alternatively, wherein the adjustment mechanism is spring loaded to expand, and actuating the adjustment mechanism further comprises compression against the expansion such that when released the spring expands to securely anchor the device between the antihelix and lower concha.

Additionally, or alternatively, further comprising actuating the adjustment mechanism with one or more digits on an individual hand of a user.

Additionally, or alternatively, wherein the carriage, the adjustment mechanism, the housing, or any combination thereof, includes detents.

Additionally, or alternatively, wherein the carriage, the housing, or both the carriage and the housing includes detents to resist or arrest movement of the carriage into one or more spaced intervals, wherein detents are one of magnetic or mechanical structures.

Additionally, or alternatively, wherein the adjustment mechanism includes detents to resist or arrest movement of the carriage into one or more spaced intervals, wherein detents are one of magnetic or mechanical structures.

Additionally, or alternatively, wherein a speaker is positioned on the first extending structure, the second extending structure, or both the first extending structure and the second extending structure.

Additionally, or alternatively, a speaker, an electrical sensor, or both a speaker and an electrical sensor is positioned on the first extending structure or the second extending structure.

This overview is intended to introduce the subject matter of the present patent application. It is not intended to provide an exclusive or exhaustive explanation. The detailed description is included to provide further information about the present patent application.

BRIEF DESCRIPTION OF THE DRAWINGS

The drawings illustrate, by way of example, but not by way of limitation, various embodiments discussed herein. In the drawings, which are not necessarily drawn to scale, like numerals may describe similar components in different views.

DETAILED DESCRIPTION

Figure 1:
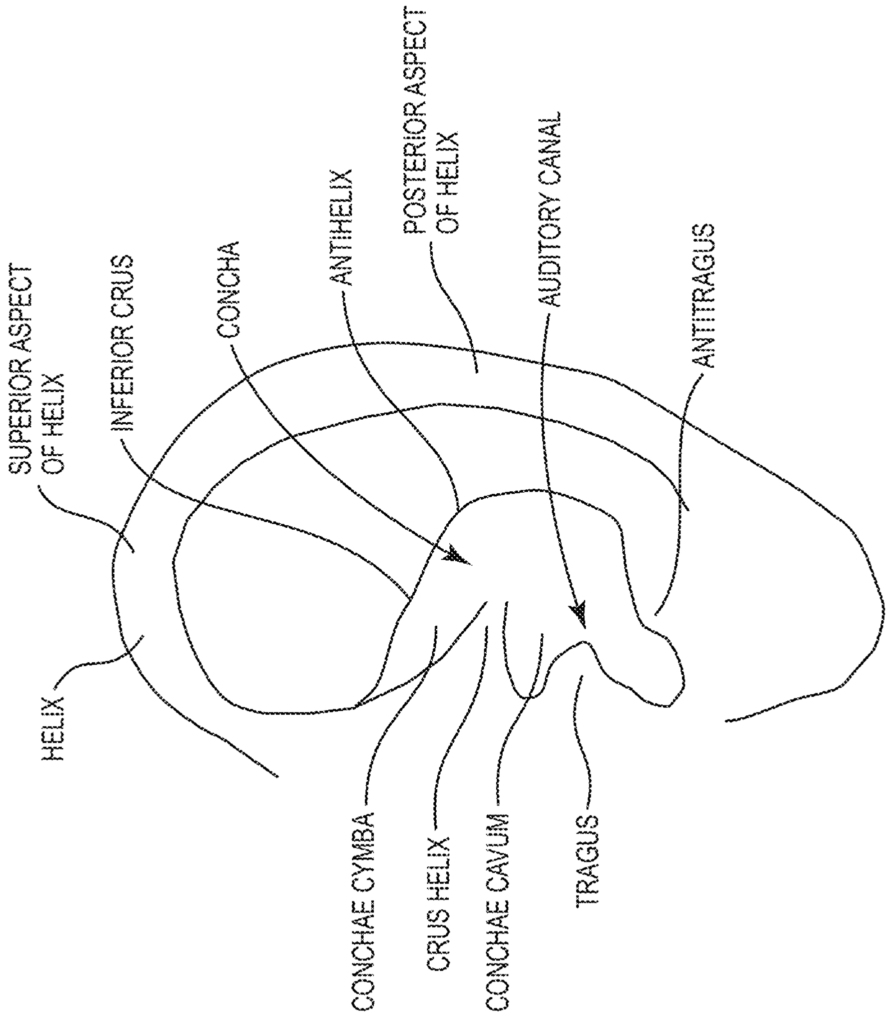
FIG. 1 is a sketch of the human ear.

FIG. 1 is a sketch of the human ear. The auditory canal is covered at its opening by the tragus, and opens adjacent the concha. The concha is typically bisected by the crus helix into the conchae cymba superiorly and conchae cavum inferiorly. The helix is the outer rim of the ear that extends from the superior insertion of the ear on the scalp to the termination of the cartilage at the earlobe, having a superior aspect and posterior aspect, as marked in the drawing. The border of the helix usually forms a rolled rim, but the helix is highly variable in shape. The crus helix is the continuation of the anteroinferior ascending portion of the helix, and as shown in the drawing, extends in a posteroinferior direction into the cavity of the concha, typically about one half to two thirds the distance across the concha. The concha is generally bordered by the antihelix superiorly and antitragus inferiorly.

The aim in some examples herein is to provide a wearable device which is compact and non-intrusive, being easily placed and operated for a user. Some examples may have an intended life of up to two weeks or longer, after which the device is intended to be discarded. Alternatively, the device can be discarded after each individual use. Other examples may provide such a wearable device, but for use at home or in other contexts and for different time durations. Some examples are characterized by having the anchoring devices are all in a single housing, which may include a clip or may be used with adhesive tape for securing the apparatus in place.

Moreover, in some embodiments, the system and/or device herein may be provided with an audio output device (e.g., a transducer or speaker). For example, the transducer or other type of audio output element can be positioned in one or both of the extending structures described herein. Hence, in some embodiments an audio output device such as a speaker can be positioned on the first extending structure or the second extending structure. A circuit board, as described herein, can be configured to operate (e.g., turn on/off, alter volume, etc.) the transducer or other type of audio output element. For instance, the system/device herein may be manifested as an auditory ear bud including a transducer such as a speaker.

Figure 2A:
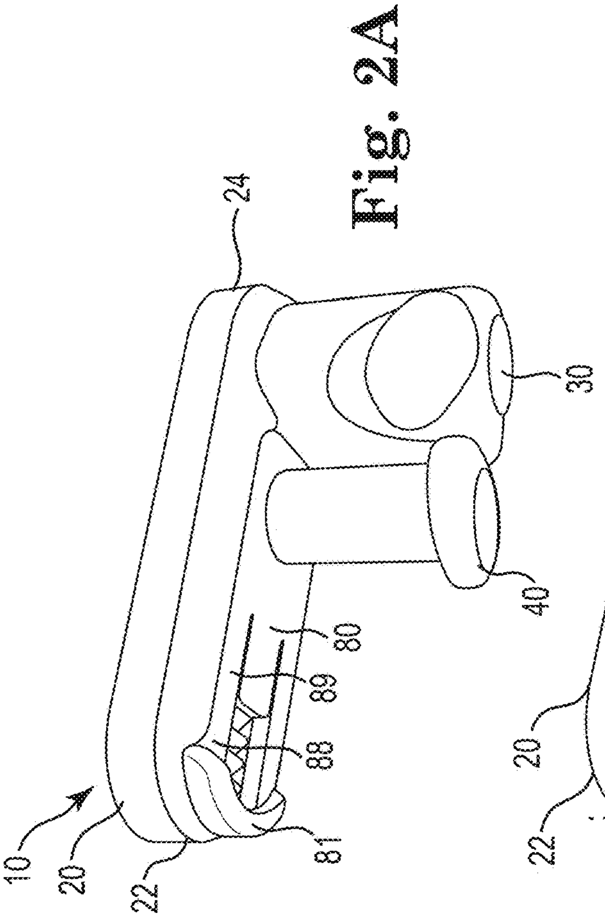
FIGS. 2A-2C are views of a first wearable device.
Figure 2B:
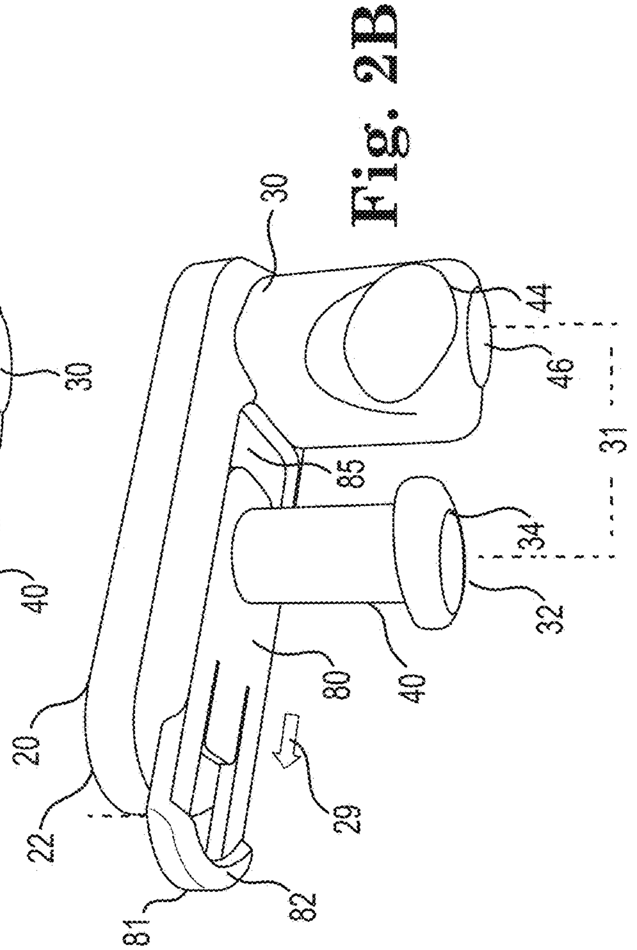
Figure 2C:
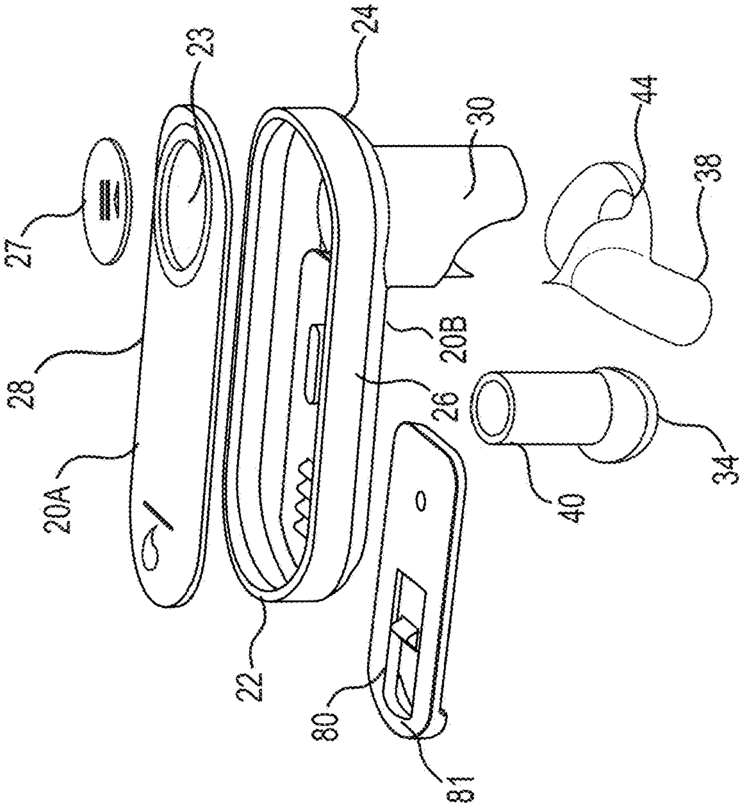

While the example of FIGS. 2A-2C (and similarly FIGS. 3A-3C, 4A-4C, and 5A-5C) is described as having speakers, in some embodiments sensors such as those described herein, other devices, methods and/or modalities can also be used. For instance, some examples herein may be directed to non-therapeutic, sensory, and/or purely auditory devices such as those including a speaker e.g., for the purpose of emitting sound or music to a user of the auditory devices and/or an electrical sensor. However, some examples may include a sensor such as electrical, optical, and magnetic sensors configured to detect or sense galvanic skin impedance, heart rate, heart rate variability, oxygenation, movement or acceleration (e.g., an accelerometer and/or gyroscope), various signals such as nerve and brain signals (e.g., an electroencephalograph), and/or the presence of one or more molecules (e.g., optical or chemical sensors) and/or configured to sense molecules in or on tissue, among other types of sensors. The sensor can be configured to detect or sense one or more of the above mentioned elements, statuses, actions, or characteristics while the devices herein are inserted in an ear of a user. As detailed herein, the sensor wherein a sensor can be positioned on the first extending structure or the second extending structure. In some embodiments, a speaker can be positioned on one of the first extending structure and the second extending structure and the sensor can be positioned on the other of the first extending structure and the second extending structure. However, in some embodiments the speak and a sensor can each be located on either the first extending structure or the second extending structure (e.g., the speaker and sensor are collocated on an individual extending structure).

FIGS. 2A-2C are views of a first wearable device 10. FIGS. 2A-2B are views of the wearable device 10, while FIG. 2C shows an exploded view of the wearable device 10. The device 10 is adapted for placement relative to an ear of a user.

A housing 20 contains electronics and a power source configured for providing output energy, which may come in various forms including, in some examples, electrical pulses or other waveforms. In some embodiments, the electronics comprises an output circuitry to provide power at least to the speaker. Illustrative circuitry is shown and discussed relative to FIG. 10, below.

The housing 20 has a length between a first end 22 and a second end 24, and a width between a first side or edge 26 and a second side or edge 28. The housing can be an elongated housing where the length between a first end 22 and a second end 24 is greater than the width in this example. For example, the length may be in the range of about 10 to about 60 millimeters, and width in the range of about 3 to about 30 millimeters, or more or less. The overall mass of the device 10 may be in the range of about 10 to about 50 grams, or more or less.

The device 10 includes a first extending structure 30 having a first end at the housing 20 and a second end apart from the housing 20. The first end of the first extending structure 30 can by coupled to or proximate to a proximal end of the carriage 80, as illustrated in FIGS. 2A-2B.

The first extending structure 30 has a length, generally in the range of about 3 to about 15 millimeters or more or less. At or near the second end of the first extending structure 30 is an anchor arm 44 extending laterally therefrom. In some examples, the device 10 may be characterized by the anchor arm 44 being configured to be positioned beneath the tragus when the device is placed. In some further examples, the anchor arm 44 is configured to be inserted into the external auditory canal of the user, providing at least a first anchoring point for the device.

Figure 3A:
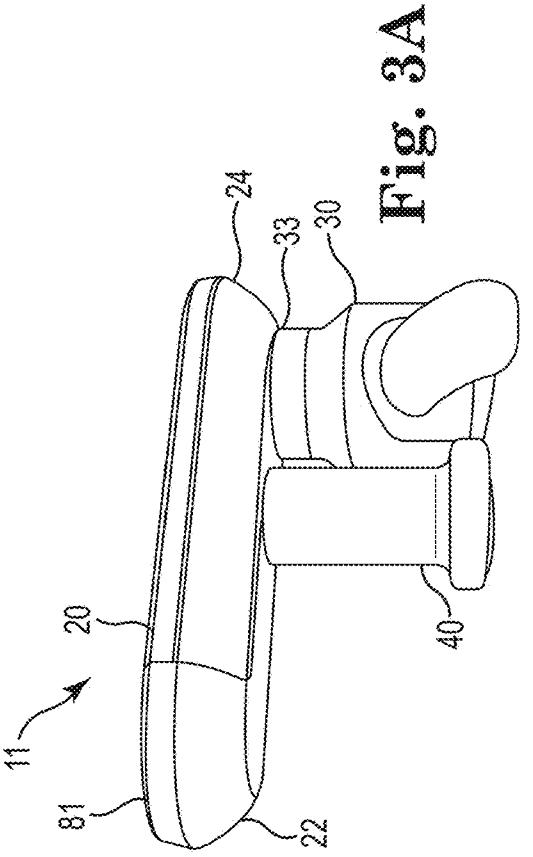
FIGS. 3A-3C are views of a second wearable device.
Figure 5A:
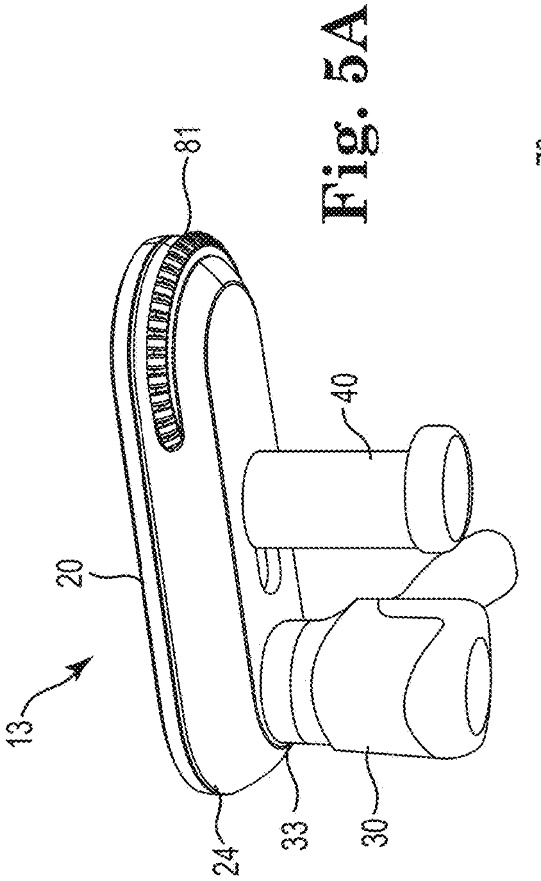
FIGS. 5A-5C are views of a fourth wearable device.

The first extending structure 30 can include a neck portion 33 located along the length of the first extending structure 30. For instance, the neck portion 33 can be located proximate or adjacent to the housing 20, as illustrated in FIGS. 3A and 5A. The neck portion 33 can have a smaller diameter than another portion or the remainder of the first extending structure 30. Stated differently, the neck portion 33 can form an indented portion of the first extending structure 30. In some embodiments, the neck portion 33 can be configured to provide an area into which tissue such as flaps of skin of the tragus and/or antitragus can overlay when the devices herein are inserted into an ear. For instance, the tragus and antitragus protrusions of the ear can desirably apply a force on the first extending structure 30 at the necked portion 33 such that the first extending structure 30 is securely retained in the ear (e.g., in the cavum) and/or an element located on the first extending structure 30 such as a speaker is thereby affixed firmly against the ear (e.g., the cavum). The neck portion 33 can optionally be configured to rotate relative to the housing 20 and/or another portion or the remainder of the first extending structure 30. The degree of rotation of the neck portion 33 can be at least 15 degrees, at least 30 degrees, or at least 45 degrees, among other possibilities.

The housing 20 includes or is attached to a second extending structure 40 having a first end at the housing 20 and a second end apart from the housing 20. The first end of the second extending structure 40 can be coupled to the carriage 80. For instance, the first end of the first extending structure 40 can be coupled to an outer surface such as the lowermost surface of the carriage 80, as illustrated in FIGS. 2A-2B. The second extending structure 40 has a length which may be in the range of about 3 to about 15 millimeters, or more or less. The length of the second extending structure may be variable, for instance, due to the presence of a spring structure or other biasing member or structure to allow flexibility or variability in a length of the housing 20 when the device is placed within an ear of a user.

Figure 3B:
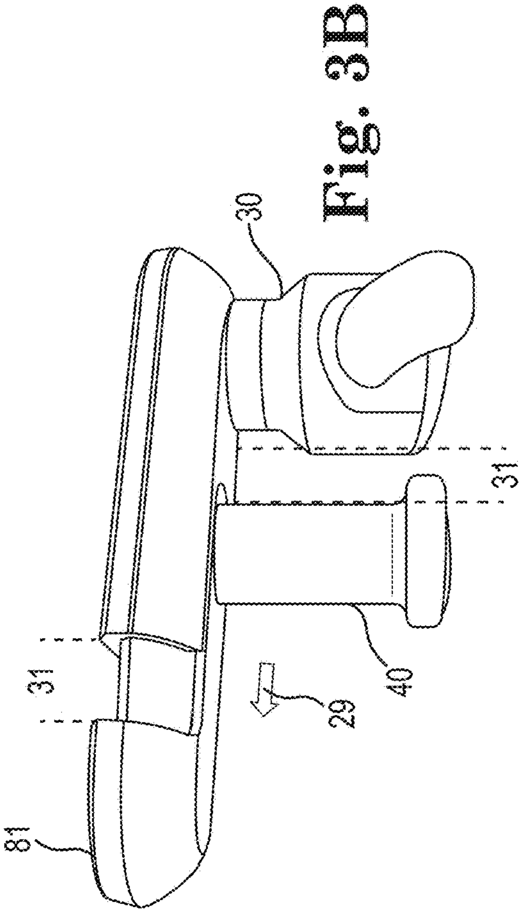

A distance 31 between the first extending structure 30 and the second extending structure 40 can be adjusted. The distance 31 can be taken from a centerline or center point of each of the first extending structure 30 and the second extending structure 40, as illustrated in FIG. 2B or can be taken from opposing surfaces of the first extending structure 30 and the second extending structure 40, as illustrated in FIG. 3B. Hence, the distance 31 can refer to a distance between opposing faces of the respective first extending structure 30 and the second extending structure 40 and/or a distance between a central axis or respective center points of the first extending structure 30 and the second extending structure 40. The distance 31 can extend substantially along a longitudinal axis of the device 10. The distance 31 can be equal to a portion of the length of the device 10. The distance 31 can be adjustable or variable when the device 10 is placed within an ear of a user. For example, the distance 31 may be in the range of about 2 to about 20 millimeters, when the device is inserted in an ear of a user (e.g., when at least a portion of the first extending structure 30 and the second extending structure 40 are inserted in an ear of a user. The distance 31 can be varied by moving (e.g., longitudinally translating) the second extending structure 40 relative to the first extending structure 30. For instance, the first extending structure 30 may be fixed at a given longitudinal position and the second extending structure 40 may be configured to move (e.g., longitudinally translate distally relative to the first extend extending structure 30), as detailed herein. For instance, the second extending structure 40 may be configured to longitudinally translate responsive to actuation of an adjustment mechanism 81. Conversely, the first extending structure may be configured to longitudinally translate responsive to actuation of an adjustment mechanism 81, for example, when the first extending structure 30 is coupled to a proximal end of the carriage 80, and the second extending structure is coupled to the housing. Furthermore, both the first and second extending structures may be configured to longitudinally translate responsive to actuation by one or more adjustment mechanism 81 and carriages 80.

The adjustment mechanism 81, as detailed herein, can refer to an individual adjustment mechanism that is manifested as an individual component. Thus, the adjustment mechanism 81 can be configured to permit readily adjusting the distance 31, even when the device 10 is disposed in a user (e.g., an ear of a user). For instance, the adjustment mechanism 81 can be configured to permit a user (e.g., a user) to adjust the distance 31 while the device 10 is disposed within an ear of the user by actuation of the adjustment mechanism with a single hand (e.g., one or more digits on the single hand), as compared to some other devices which require any adjustment to be performed prior to insertion of a device in the user and/or which require the use of two or more hands to adjust the device. That is, the adjustment mechanism 81 permits precise adjustment of the second extending structure's position relative to the first extending structure's position, ensuring optimal placement of the speaker or audio output device(s) e.g., on the conchae cymba without the need of the user to remove the device from the ear.

The adjustment mechanism 81 can be located at the first end 22 of the housing 20. Having the adjustment mechanism 81 be located at the first end 22 of the housing can promote aspects herein such as permitting a user to readily adjust the distance 31, even when the device 10 is disposed in an ear or a user. For instance, the adjustment mechanism 81 can be located at the first end 22 of the housing 20 and a portion (e.g., first portion) of the adjustment mechanism 81 can be located outside of the housing 20, while another portion of the adjustment mechanism 81 can be located inside of the housing 20. The portion of the adjustment mechanism 81 that extends outside of the housing 20 can thus extend (e.g., in a substantially longitudinal direction) a distance away from the first end 22 of the housing 20. The portion of the adjustment mechanism 81 that extends outside of the housing 20 can be contacted by one or more digits on a hand of a user and the other portion of the adjustment mechanism can be configured to adjust or move the carriage 80 responsive to the contact. The portion (e.g., second portion) of the adjustment mechanism 81 that is inside the housing can be integral with or coupled to the carriage 80. For instance, as detailed herein, the second extending structure 40 can be coupled to the carriage 80. Thus, the movement of the carriage 80 can impart a corresponding movement in the second extending structure 40. For example, actuation of the first portion of the actuation mechanism 81 can directly or indirectly cause the carriage 80 to move, as detailed herein, thereby imparting a corresponding movement in the second extending structure 40 (e.g., in the same direction and magnitude as the movement in the carriage 80). One or more mechanisms 81 can be integral or coupled to more than one carriage 80 to impart movement on both the first and second extending structures.

Figure 3C:
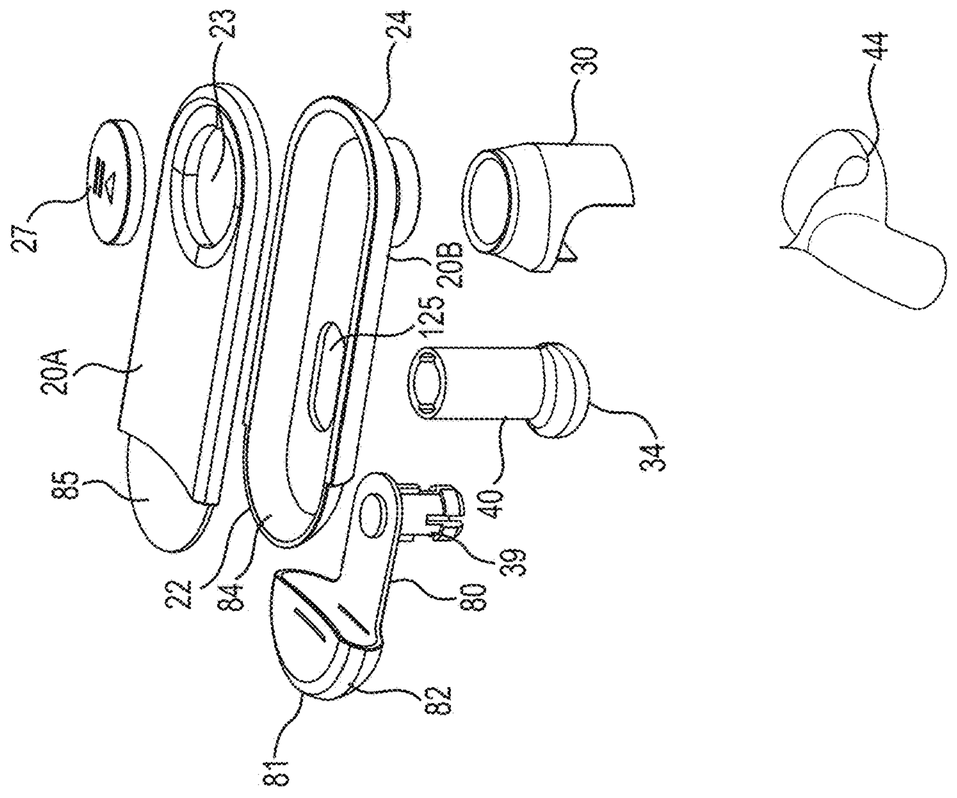

As mentioned, in some embodiments the adjustment mechanism 81 can be integral with the carriage 80. For example, as illustrated in FIGS. 2A-2C and 3A-3C, the adjustment mechanism can be integral with the carriage 80. In such examples, the adjustment mechanism 81 can be located on a first end of the carriage 80. The first end of the carriage 80 refers to an end of the carriage 80 that is spaced away or least proximate to the first and second extending structures. Having the adjustment mechanism 81 be located on or integrally formed in the first end of the carriage 80 can promote aspects herein such as readily permitting a user to adjust the distance 31, even when the device 10 is implanted or disposed in an ear of a user. For instance, the adjustment mechanism 81 can include a fixed protrusion extending radially from the carriage 80. Stated differently, the adjustment mechanism 81 can be formed of an integral fixed protrusion that extends from the carriage 80. For example, the adjustment mechanism 81 can be manifested as a raised surface or protrusion that extends (e.g., radially and/or longitudinally) a distance from the carriage 80, as illustrated in FIGS. 2A-2C. Other configurations of the adjustment mechanism 81 are possible. For instance, the adjustment mechanism 81 can be manifested as a recessed or indented portion of a surface (e.g., an indented portion in an end of a protrusion extending radially from the carriage 80), as illustrated in FIGS. 3A-3C.

As mentioned, in some embodiments the adjustment mechanism 81 can be a separate component that is coupled to the carriage 80. For instance, the adjustment mechanism 81 can be a separate component that is coupled to a first end (e.g., that is spaced away from or least proximate to the first and second extending structures) of the carriage 80. For example, as illustrated in FIGS. 4A-4C and 5A-5C, the adjustment mechanism 81 can be a separate component that is coupled to the first end of the carriage 80. In such instances, the adjustment mechanism 81 can be a rotatable adjustment mechanism such as a rotatable wheel or rotatable lever. For instance, the adjustment mechanism 81 can be a rotatable adjustment mechanism including an annulus (e.g., annulus 93, as illustrated in FIGS. 4C and 5C), wherein the rotatable adjustment mechanism is configured to rotate about the annulus 93 relative to the carriage 80, the housing 20, or both the carriage 80 and the housing 20, as detailed herein. Hence, the rotatable adjustment mechanism (e.g., a rotatable lever or rotatable wheel) can be configured to rotate about a plane (extending through the annulus 93) that is normal to a longitudinal axis of the device 10 such that rotation of the adjustment mechanism imparts a force to cause longitudinal movement (e.g., translation) of the carriage 80, as detailed herein.

In some embodiments, the carriage 80, the actuation mechanism 81, and/or the housing 20 can include detents that are configured to predispose the carriage 80 to corresponding longitudinal positions along a length of travel (e.g., longitudinal translation) of the carriage 80. Employing detents can promote aspects herein such as promoting retention of the devices herein within an ear of a user i.e., once the carriage 80 is disposed at a given longitudinal position corresponding to one or more of the detents. For instance, the presence of the detents can permit the carriage 80 to move between and be disposed in one or more fixed positions (e.g., three different longitudinal positions) to accommodate different sized ears (e.g., small, medium, and large sized ears) of various users of the devices herein.

The detents can be mechanical detents and/or magnetic detents (e.g., formed of two or more magnets including a magnet coupled to the carriage 80 and a magnet coupled to the housing 20). For instance, the carriage 80 can include detents located along one or more of the substantially longitudinally extending side surfaces of the carriage 80 and/or that are located along the elongated slot 98 or other aperture in the carriage 80. In some embodiments, the detents of the carriage 80 can be manifested as one or more substantially radially projecting arms or features. In some embodiments, the detents of the carriage 80 can be manifested as a series of undulating ridges (e.g., peaks and valleys disposed therebetween). The detents can be configured to predispose the carriage 80 to longitudinal positions associated with the valleys (e.g., at spaced intervals between adjacent valleys), while the peaks can be configured to provide a degree of resistance to the longitudinal movement (e.g., translation) of the carriage 80. The housing 20 can include one or more corresponding detents or projections that are configured to mechanically interfaces with the detents of the carriage 80. In some embodiments, the corresponding detents 89 can be manifested as one or more arms or projections or as a series of undulating ridges (e.g., peaks and valleys). In some embodiments, the corresponding detents 89 can be manifested as one or more pegs or projections, as illustrated in FIG. 4C.

As detailed herein, the carriage 80, the housing 20, or both the carriage 80 and the housing 20 can include detents that are configured to predispose the carriage to one or more longitudinal positions along a length of travel of the carriage 80. For example, FIG. 4C illustrates the presence of detents 88 along a substantially longitudinally extending surface of the elongated slot 98. In such instances, the housing 20 can have a corresponding substantially longitudinally extending surface with corresponding detents. For example, an interior surface (most proximal to the carriage 80) of an elongated peg 99 can include detents 89 that are configured to interface with (e.g., interference fit with) the detents 88 and permit the carriage 80 to be moved longitudinally between one or more positions at which the detents 88 of the carriage 80 and the corresponding detents 89 of the housing 20 predispose the carriage 80.

In some embodiments, the location of the detents 88 of the carriage 80 and/or the location of the corresponding detents of the housing 20 can be varied for the locations in FIG. 4C. For instance, the detents 89 of the housing 20 can be located on one or both of the molded pieces 20A, 20B. In other examples, the detents can be located on the adjustment mechanism 81, the housing 20, or both the adjustment mechanism 81 and the housing 20. For example, detents 88 can be located on the adjustment mechanism 81 along at least a portion of an exterior surface of the adjustment mechanism 81 and the housing 20 can include corresponding detents 89 that are configured to interface with the detents 88 on the actuation mechanism 81. An example of alternative locations for the detents 88 and the corresponding detents 89, is indicated in FIG. 2A.

Alternatively, or in addition to varying the location of the detents 88 and/or the corresponding detents 89, the structures of the detents 88 and/or the corresponding detents 89 can be varied. For instance, one of the detents 88 and the corresponding detents 89 can be manifested as a peg or projection, while the other of the detents 88 and the corresponding detents 89 can be manifested as a series of undulating ridges (e.g., peaks and valleys). For example, the detents 88 can be configured as a series of undulating ridges and the corresponding detents 89 can be manifested as one or more peg or projection that is configured to interface with the detents 88, as illustrated in FIG. 4C, or the detents 88 can be configured as a peg or projection and the corresponding detents 89 can be manifested as a series of ridges (e.g., peaks and valleys).

The housing 20 may comprise molded pieces 20A, 20B assembled together. In this example, the first molded piece 20A may be an upper lid and a second molded piece 20B may have a lower container to which the upper lid attaches, collectively forming housing 20. In this example, the first extending structure 30 is shown to be integrally molded as part of the lower container 20B. Molded into the lower container 20B is an internal channel 85 configured to receive carriage 80. However, other configurations of the lower container 20B and the carriage 80 such as those having the internal channel 85 in a different location or an absence of the internal channel 85 are possible. In some examples, the carriage 80 and the upper portion (most proximate to the carriage) of the second extending structure 40 may be molded together as a singular piece for positioning into the internal channel 85.

In some embodiments, the lower container 20B also includes an elongated aperture 125, situated between the first extending structure 30 and the first end 22 of the housing 20, for instance, as illustrated in FIGS. 3C, 4C, and 5C herein. In such embodiments, the carriage 80 can include a lower portion the extends through the aperture 125 to contact an upper portion of the second extending structure 40. Alternatively, an upper portion of second extending structure 40 can protrude through the aperture 125 away from the housing 20. In any case, the position of the carriage 80 in housing 20 (e.g., the position of the carriage 80 within the internal channel 85) is adjustable, and by virtue of the second extending structure 40 being coupled to carriage 80, the position of the second extending structure 30 is also adjustable. That is, the space between the first extending structure and the second extending structure is adjustable.

In some embodiments, the aperture 125 allows the second extending structure 40 to protrude through the lower container 20B and the internal channel 85 exceeds the length of the aperture 125, providing a guided pathway for the carriage 80 to slide within the lower container 20B. As a consequence of such configuration, the range of the carriage 80 movement can be limited to the extent that the second extending structure 40 can moveably slide within the bounds of the elongated aperture 125. This range of movement is illustrated, for instance, in part by the arrow 29 in FIG. 3B.

By limiting such movement to the range allowed by the elongated aperture 125, manufacturing and assembly are made easier than if the housing had two components which slide together and apart, as controlling the maximum extent of movement is relatively simple. In an alternative example, rather than an aperture as shown in FIG. 3B, the overall housing 20 may have first and second components that mate together in sliding fashion to allow the length of the housing itself to be varied.

In some examples, a shroud or cover can overlay a portion of or an entirety of the apertures described herein. The shroud or cover can be configured to prevent or mitigate ingress of material (e.g., liquids and/or particulate materials). The cover can be formed of a relatively thin and/or deformable sheet of material. Examples of suitable materials for the cover include various thermoplastics (e.g., polyethylene, polypropylene, polyvinyl chloride, Polyethylene Terephthalate, EVA (Ethylene Vinyl Acetate), Polyamide (Nylon), among others. In some examples, the cover can be located internal to the housing 20 and permit a component such as at least a portion of the carriage 80 to project through the cover to a location outside of the housing 80, for instance, to mitigate ingress of material into the housing 20.

During or subsequent to placement of the device in the ear of the user, a position (longitudinal position) of the carriage 80 can be adjusted such that the sensor 32 is positioned on a conchae cymba while the speaker 46 is positioned desirably at the conchae caverna. Y et, in some examples, the sensor 32 may be positioned at the conchae caverna. In this configuration, the sensor 32 is not part of the second extending structure 40, but rather integrated into housing 20 or the first extending structure 30, enabling the sensor 32 to be in contact with different areas of the conchae once the device 10 is in position. In this example, the second extending structure 40 remains useful for stabilizing and securely attaching the wearable device 10 to the ear, regardless of whether a sensor or speaker is carried thereon.

In some examples, the user may adjust the positioning of the sensor 32 by manipulating a position of the carriage 80 with the housing 20 from outside of the device e.g., wearable device 10. By enabling adjustment from outside of the wearable device 10, the wearable device 10 does not have to be removed from its previously secured location (e.g., within an ear). This form of manipulation also enables precise adaptation to individual ear anatomies, without compromising the stability of the wearable device 10 placement as previously positioned. Adjustment of the carriage 80 in the housing 20 (e.g., within the internal channel 85 in the housing 20) may be done manually or via a spring-loaded mechanism. In the examples that use a spring-loaded mechanism, the mechanism can be compressed during wearable device 10 placement in the ear and subsequently released to expand relative to a portion of the ear (e.g., the inferior crus, helix, or antihelix), effectively securing the wearable device 10 in the ear. This expansion creates a counterforce against the conchae cavum, so that the first extending structure 30 is in contact against tragus and/or anti-tragus, ensuring a snug fit. In some examples, the spring-loaded mechanism incorporates a latch system, allowing the wearable device 10 to be locked in various positions between fully compressed and fully extended states. This allows further customization the fit and positioning of the wearable device 10 in accordance to the user's ear anatomy and comfort preferences, while maintaining the device's stability and effectiveness. In the manual configuration, users may adjust the positioning as needed including, but not limited to, using their fingers, tabs, hooks, loops, or pivoting levers. This adjustment can be done either before or after wearable device 10 has been placed in the ear.

The second extending structure 40 may have a variable shape, allowing for bending to a desired angle, and/or may rotate or pivot, so that the device can be adjusted to fit the user's ear. For example, FIG. 10D illustrates a variable length and pivoting mechanical structure; in other examples the structure itself may be flexible.

As mentioned, in some examples, the housing 20 comprises molded pieces assembled together. For example, a first molded piece 20A may be an upper lid and a second molded 20B piece may be a lower container to which the upper lid attaches, thereby substantially forming the housing 20. Other manufacturing methods can be used. The first extending structure 30 may be a molded part of a lower container forming part of the housing 20, with the anchor arm 44 or a portion thereof included as part of the molding step, or attached thereto in a subsequent manufacturing step. Other assembly or manufacturing methods can be used.

The example shown here includes a speaker 46 on the first extending structure 30, and, optionally, a sensor 32 on the second extending structure 40. Some examples may omit the sensor 32. Desirably, the positioning and/or degree of insertion of the anchor arm 34 may be such that the sensor 32 and the speaker 46 come into contact with the skin in the ear of the user.

The anchor arm, or "wing" 34, located at the second end of the second extending structure 40 may have an expanded end portion coupled by a thinner portion coupled to the second extending structure. Stated another way, the radial dimensions of the anchor arm or wing 34 may extend outward beyond (e.g., be larger than) the radial dimensions of the extending structure 40, as shown for example by FIG. 2B. The radial dimensions of the anchor arm or wing 34 may vary around its perimeter to form one or more edges or "lips" of varying size. The one or more ridges or lips of the anchor arm or wing 34 may be placed under the ridges and folds of skin formed by the helix, inferior crus, and antihelix. In some examples, when an illustrative device (e.g., the device 10) is placed in the ear, a portion of the anchor arm or wing 34 proximal to the helix may extend further than a portion of the anchor arm or wing 34 proximal to the inferior crus and antihelix, as appropriate to fit within the depths of skin folds formed by the helix, inferior crus, and antihelix. The curvature of the perimeter of the anchor arm or wing 34 may vary to optimally fit the curvature of the outer boundaries of the cymba formed by the helix, inferior crus, and antihelix. In some examples, the anchor arm or wing 34 may be rigidly coupled to the second extending structure 40. In some examples, the anchor arm or wing 34 may rotate relative to the housing 20. Rotation of the anchor arm or wing 34 may permit an improved fit to varying curvatures or differing geometries of the helix, inferior crus, and antihelix across users of the devices herein. The device 10 can be configured such that a distance between the first extending structure 30 and the second extending structure 40 is adjustable. For instance, adjustment of the distance between the between the first extending structure 30 and the second extending structure 40 can be adjustable via actuation or movement of the carriage 80. In such instances, movement of the carriage 80 can impart a corresponding movement (e.g., of the same magnitude and direction) in the second extending structure 40 and anchor arm or "wing" 34 e.g., as the anchor arm 34 is coupled to the first extending structure 40, which is coupled to the carriage 80. The device 10 can be configured such that the anchor arm or "wing", 34, is positioned under any portion of the helix, inferior crus, and antihelix such that any portion of a ridge, or lip, of the anchor arm or wing 34 is held against the ear and resists dislodgement of the device 10 when a counter force is imparted against the tragus and antitragus when the carriage 80 is extended.

As highlighted in FIG. 2C, the anchor arm 44 may include an expanded or bulbous end portion coupled by a thinner portion to the first extending structure 30. While a bulbous end portion is shown, other shapes (oval, polygon, tapered, conical, etc.) may be used instead, and/or the end portion can be or include a foam material that can be compressed prior to placement, and then expands to secure the device in an anchored position. Alternatively, in other examples, the anchor arm 44 may have a consistent or tapered outer profile from its connection to the first extending structure 30 to its tip. The anchor arm 44 and end structure 38 may be a unitary or single piece, and may be hollow to allow audio signals to pass therethrough. In some examples, a speaker may be integrated into the device to deliver audio signals. The anchor arm 44 may also include one or more sensors or a speaker thereon. The anchor arm 44 and/or end structure 38 may be provided as a detachable/replaceable piece that can be selected from a range of sizes or shapes. In some examples, the anchor arm 44 and/or end structure 38 thereof may be formed of a compliant material to conform to the space under the tragus and/or inside the auditory canal.

The anchor arm 44 may extend at an angle relative direction of the length of the housing. The angle can be about ninety degrees, but in other examples it is envisioned that the angle can be in the range of about 60 to about 120 degrees, or about 70 to about 110 degrees, or about 80 to about 100 degrees. In an example, the angle of the anchor arm 44 may be adjustable, if desired, such as by use of a click-mechanism or flexible material to allow the anchor arm 44 to twist about the first extending structure 30. In still another example, the first extending structure 30 may be adjustable to twist about, for example, a central core (e.g., necked portion 33), entirely or through a limited range of motion such as (using the angle of the anchor arm as a guide) between about 60 to about 120 degrees, or more or less as desired. In the illustrative example shown in FIGS. 2A-2C, 3A-3C, 4A-4C, and 5A-5C, the position of the anchor arm 44 is fixed. One or more stops may be included to limit the translation, extension or rotation of the anchor arm 44, to the extent it is adjustable. The first and second extending structures 30, 40 may likewise be adjustable in terms of translation, extension/retraction and/or rotation, as desired.

If desired, one or more through-openings or holes may be provided in the anchor arm 44 to allow air ingress/egress, facilitating hearing for the user by avoiding complete blockage of the auditory canal. The anchor arm 44 may further include one or more sensors and/or transducers, either for therapy purposes or to enable or augment hearing of a user or to emit music. For example, a speaker may be provided, allowing the user/user to hear audible indications of device and/or therapy status, to amplify sounds (as with a hearing aid), or to provide entertainment or communications to the user/user.

In first example, when the device 10 is placed relative to the ear of the user, the anchor arm 44 is positioned to extend beneath the tragus, while the sensor 32 is positioned at (i.e. in contact with) the conchae cymba, and the speaker 46 is positioned at (i.e., in contact with) the conchae caverna. In second example, when the device 10 is placed relative to the ear of the user, the anchor arm 44 is positioned to extend beneath the tragus, while the sensor 32 and the speaker 46 are on opposing sides of the crus helix. In a third example, when the device 10 is placed relative to the ear of the user, the anchor arm 44 is positioned to extend into the auditory canal, while the sensor 32 is positioned at (i.e., in contact with) the conchae cymba, and the speaker 46 is positioned at (i.e. in contact with) the conchae caverna. In an example, when the device 10 is placed relative to the ear of the user, the anchor arm 44 is positioned to extend into the auditory canal, while the sensor 32 and the speaker 46 are on opposing sides of the crus helix. These examples are not intended to be an exhaustive list of descriptions of the device positioning.

In some embodiments, the device 10 can be affixed to the ear in an absence of a clip, tape, and/or another type of attachment mechanism. For instance, as illustrated in FIGS. 2A-2C, the device 10 does not include a clip or adhesive tape. Instead, the device can be secured in place by the extending structures themselves and the anchor arms 44 and 34. The second extending structure 40, in some embodiments, aids in holding the device by having a variable length, using, for example, a spring loaded or otherwise adjustable connection between the upper part and lower part thereof, holding the sensor 32 on the skin of the user while the anchor arm (or "wing") 34 of the second extending structure 40 holds the device in a desired position and secures the placement of the sensor 32. For instance, abutment of the second extending structure to a first portion of an ear (e.g., the inferior crus and antihelix) creates an opposing force to the first extending structure positioned against a second portion of the ear (e.g., the antitragus). Stated differently, in some embodiments the second extending structure is configured to abut a first portion of an ear to create an opposing force to the first extending structure which is configured to abut a second portion of the ear, wherein the first portion of the ear is the inferior crus, the antihelix, or both, and wherein the second portion of the ear is the antitragus. As detailed herein, the speaker and/or a sensor can be located on the first extending structure and/or the second extending structure. Hence, the speaker and/or sensor located on one or both of the first and second extending structures can readily convey sound to the ear of the user and/or sense one or more parameters of conditions of the ear e.g., while the second extending structure abuts the first portion of the ear to create the opposing force to the first extending structure which abuts a second portion of the ear. Additionally, in some embodiment abutment of the anchor arm or wing of the second extending structure in the ear (e.g., beneath the anterior fold of the helix superior to the tragus) creates an opposing force to posterior rotation of the device relative to the ear, as does abutment of a portion of the anchor arm or wing of the second extending structure in the ear (e.g., beneath the fold of the inferior crus and/or antihelix). Optionally, the examples herein can also include a clip (not illustrated), adhesive tape, or other for clipping the device 10 into a desired position in the ear of a user.

Portion of the housing and/or the speaker and/or sensor elements of the device can be designed to be modular, allowing for easy customization and adaptability to individual user needs. This feature enables users to easily change out the speaker and/or sensor as necessary, providing a tailored device for each user. For instance, the modular design enhances the versatility and flexibility of the device, ensuring that it can be easily adjusted to accommodate different anatomic requirements. Modularity may be provided by, for example, providing aspects of the device housing and/or speaker or sensor elements in the system in a range of sizes or types. For example, if a speaker is used to emit sound waves, the speaker or a portion of the housing on or in which the speaker resides (e.g., an earbud) may come in different sizes (surface areas) and/or shapes, which may be selected and/or replaced. Aspects of the housing and the extending structures can also be adjustable or replaceable to accommodate different anatomies (larger or smaller ears), including, for example, pediatric sized systems for smaller ears. The system itself may come in a range of sizes, if desired.

The device may be controllable and/or programmable or reprogrammable, such as by plug-in-type attachment to a port located on the device, or by use of magnetic/inductive, wireless (RF, such as Bluetooth) communication, optical communication, or by having one or more buttons, dials, or other user-accessible controls accessible on the device. To this end, as discussed further below with reference to FIG. 10, a communications circuitry may be included in the device.

The materials used throughout may include any material suitable for skin contact for an extended period of time (hours, days or even weeks).

The housing 20 optionally includes indicator lights such as status indicator lights and/or alert lights. If desired, a speaker may be included in or on the housing 20 as well and used for issuing audible alerts, instructions for use, device status, or other purposes such as for providing an audible signal for entertainment or relaxation purposes (playing music for example). The status indicator lights may be light emitting diodes (LEDs) or any other suitable light generator, as desired.

In some embodiments, the device 10 can include one optical indicator for providing an indication of a state of the wearable device. For instance, the at least one optical indicator can be manifested as a multi-purpose light-emitting diode configured in a ring 351, as detailed herein.

The devices herein such as can contain a transceiver, such as a Bluetooth chip and antenna, to permit communication with an external device such as a smartphone or tablet. Alternatively, or in addition, in some embodiments the devices herein can include a port configured to receive a cable or a cord that can communicatively couple the devices herein to another device (e.g., a smartphone) that is configured to operate the devices herein. Other communication means can be used, including optical, magnetic/inductive, vibratory, etc., as desired. Alternatively, one or more buttons on the device may be used to increase or decrease output amplitude, as desired; additional indicators on the device may be used to allow amplitude settings to be determined visually. Some systems may, on the other hand, be pre-programmed with limited or no therapy adjustments available.

Some of the preceding examples indicate the use or possibility of reshapeable first extending structure 30 and/or second extending structure 40, or an anchor arm 44, or an anchor arm 34, which are reshapeable. Other examples make each of these pieces a rigid element not allowing for reshaping. In some examples, a rigid second extending structure 40 has a spring or other resilient member therein allowing the length to vary in response to user anatomy. The device may then be placed by inserting the anchor arm 44 with its end in the auditory canal of the user, and then twisting the device to bring the second extending structure into contact with the conchae cymba. The twisting movement may be as indicated by arrow and line 260 in FIG. 6, below, until the second extending structure 40 or attached anchor arm (or "wing") 34 abuts the crus helix or antihelix, as explained relative to FIG. 6.

FIGS. 3A-3C are views of a second wearable device 11. The second wearable device 11 is analogous to the first wearable device 10 with the change that the adjustment mechanism 81 and components associated therewith (e.g., in contact therewith) are different. For instance, as illustrated in FIGS. 3A-3C, the adjustment mechanism 81 can include a protrusion 82 extending radially from the carriage 80 in a second direction (toward the first molded piece 20A), whereas the adjustment mechanism 81 of the first wearable device 10 is a protrusion 82 extending radially from the carriage in a first direct (away from the first molded piece 20A). Moreover, the adjustment mechanism 81 of the carriage 80 can be the first end 22 of the second wearable device 11, whereas the first end 22 of device 10 can be formed of the housing 20 (e.g., the carriage can move distal to the first end 22 of the device 10). Additionally, the protrusion forming the adjustment mechanism 81 of the second wearable device 11 can have an indented or recessed portion configured to be contacted by a user, whereas the protrusion forming the adjustment mechanism 81 of the first wearable device 10 can be a tab with planar surface that is configured to be contacted by the user.

Further, the carriage 80 of the second wearable device 11 can include an extended portion 39 configured to extend through an elongated aperture 125 formed in the second molded piece 20B of the housing 20. The extended portion 39 can be configured to be inserted in and coupled to the second extending structure 40 e.g., via a friction fit or interference fit of tabs or ribs located on an end or other portion of the extended portion 39 within an opening in the second extending structure 40. In contrast, second molded piece 20B of the housing 20 of the first wearable device 10 does not include an elongated aperture 125. Instead and as mentioned, the carriage 80 of the first wearable device 10 can be located within the channel 85 formed in an exterior bottom surface of in the second molded piece 20B of the housing 20 and the second extending structure 40 can be coupled directly to a substantially planar surface of the carriage 80, as illustrated in FIGS. 2A-2C.

Figure 4A:
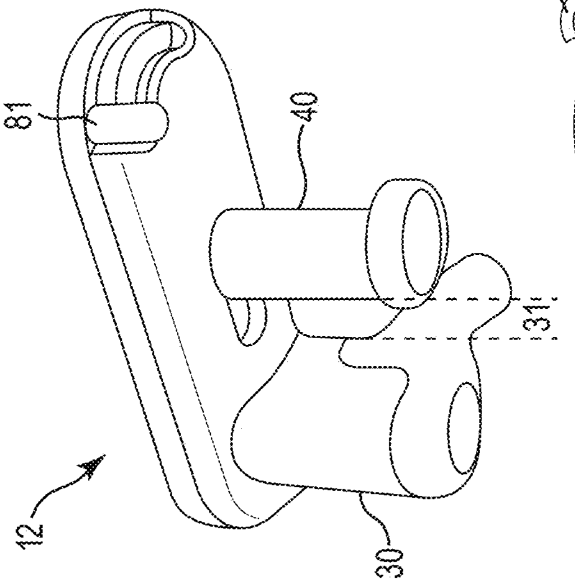
FIGS. 4A-4C are views of a third wearable device.
Figure 4B:
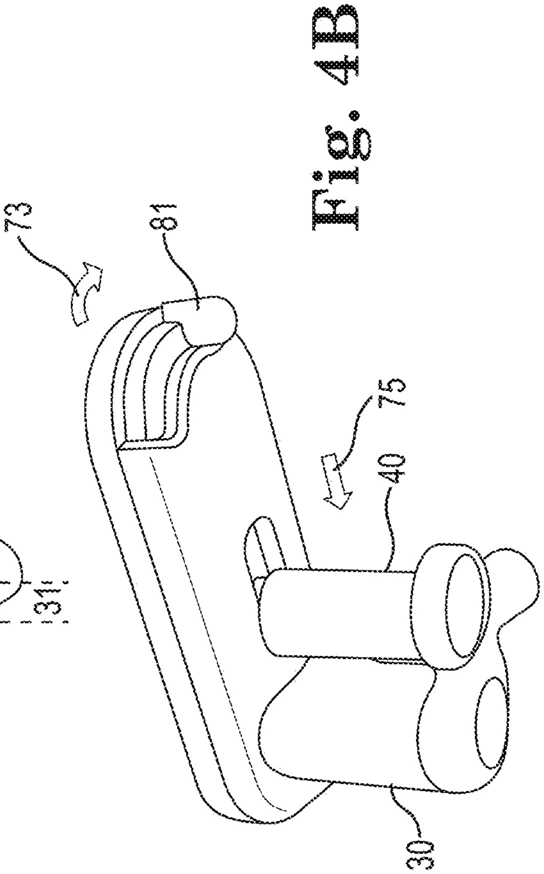
Figure 4C:
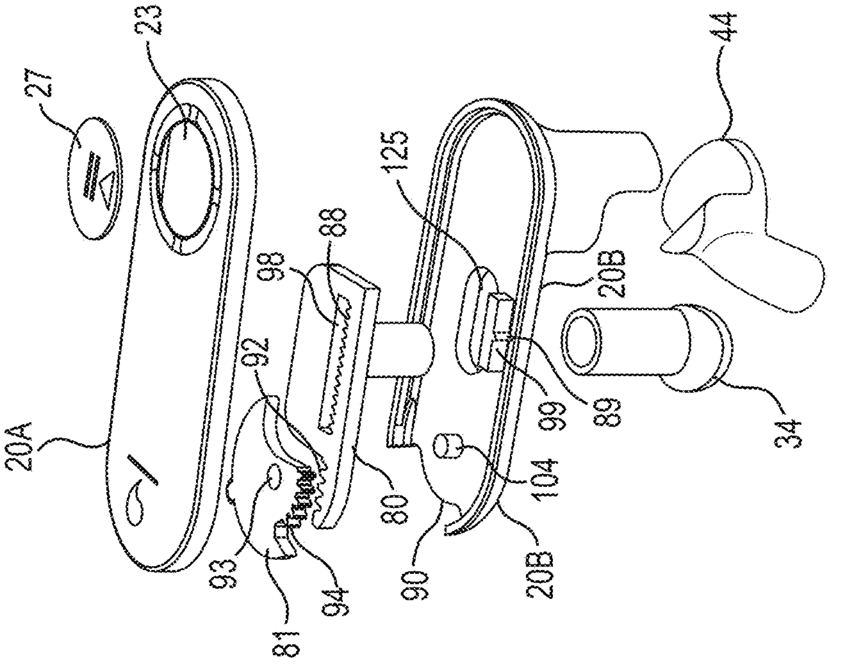
Figure 5B:
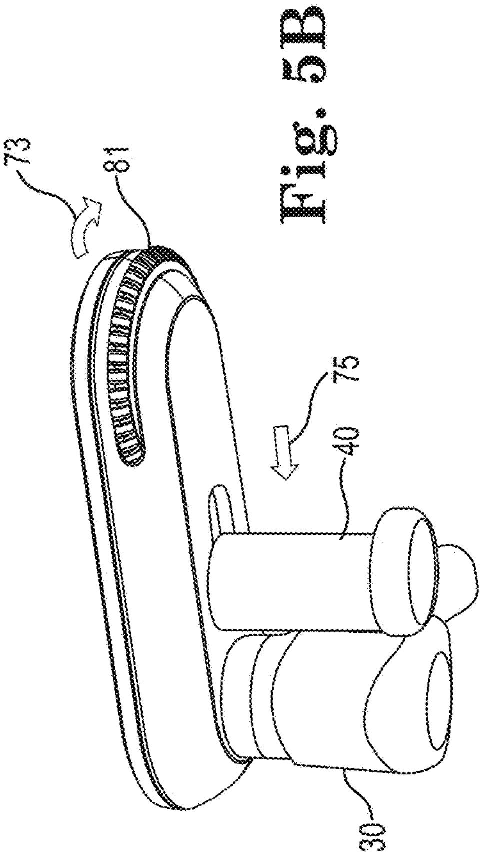
Figure 5C:
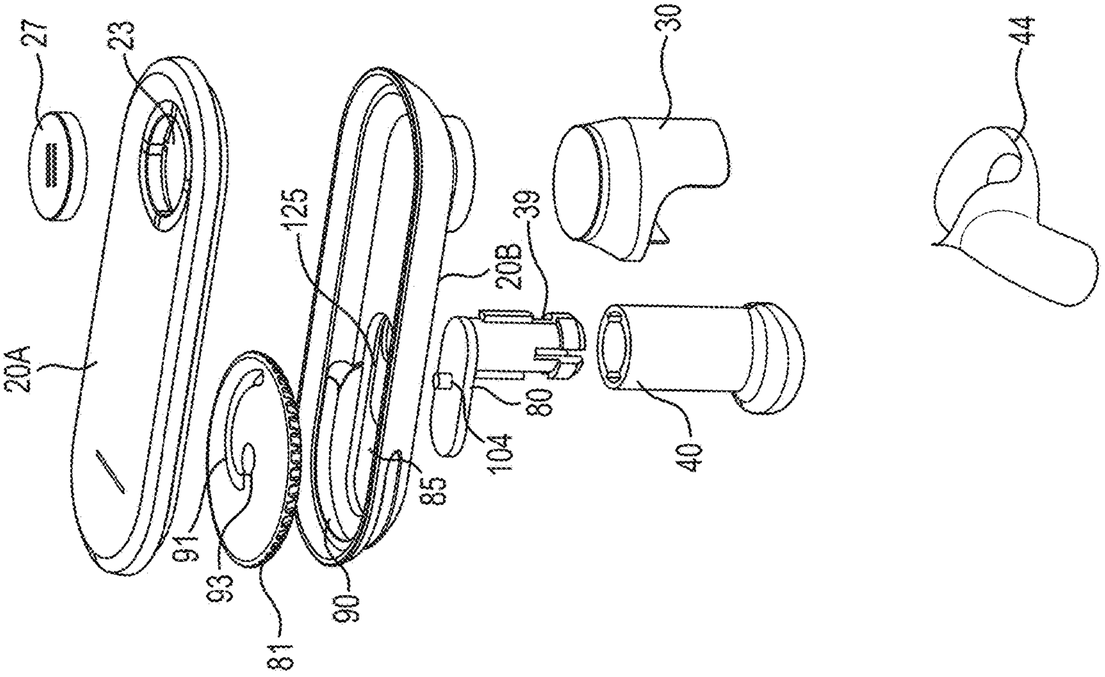

FIGS. 4A-4C are views of a third wearable device 12, while FIGS. 5A-5C are views of a fourth wearable device 13. The third wearable device 12 and the fourth wearable device 13 are analogous the first wearable device 10 with the change that the adjustment mechanism 81 and components associated therewith (e.g., in contact therewith) are different. For instance, FIGS. 4A-4C illustrate embodiments where the adjustment mechanism is manifested as a rotatable lever, while FIGS. 5A-5C illustrate embodiments where the adjustment mechanisms is manifested as a rotatable wheel. Hence, each of FIGS. 5A-5C illustrate embodiments wherein the adjustment mechanism is manifested as a rotatable adjustment mechanism.

The rotatable adjustment mechanisms may be rotatable, at least partially, about an annulus 93 and/or a peg 104 disposed in the annulus 93. The range of rotation may be anywhere from about 10 degrees to about 360 degrees. For instance, the rotatable lever illustrated in FIGS. 4A-4C and the rotatable wheel illustrated in FIG. 5A-5C may have a range of rotation that is in a range from about 10 to about 50 degrees. Each of the rotatable lever and the rotatable wheel may include a portion that is exposed from the housing 20 (e.g., a lever or a portion of the wheel) can is configured to be contacted by a user to impart rotation of the rotatably adjustment mechanism. That is, the housing 20 can include a slot or opening 90 at an end of the housing 20 that permits the wheel or the lever to protrude (e.g., in a substantially longitudinally direction) and extend a distance from the housing 20, while another portion of the adjustment mechanism 81 is disposed in the housing. For instance, the lever or a portion of the wheel can extend extending laterally through the slot 90 to a position outside of the housing 20, thereby permitting a user to actuate (rotate) the rotatable adjustment via contact with the lever or portion of the wheel outside of the housing 20.

As mentioned, the second extending structure 40 can be coupled to the carriage 80. As illustrated in FIGS. 4A-4C and 5A-5C, the carriage 80 of the third and fourth wearable devices 12, 13 can include an extended portion 39 configured to extend through an elongated aperture 125 formed in the second molded piece 20B of the housing 20. The extended portion 39 can be configured to be inserted in or around and otherwise be coupled to the second extending structure 40 e.g., via a friction fit or interference fit of tabs or ribs located on an end or other portion of the extended portion 39 within an opening in the second extending structure 40. These are merely examples, alternate or additional mechanisms of coupling the components herein are possible such as coupling components together via a first connector (e.g., male connector) associated with or integral with a first component and a second corresponding connector (e.g., a female connector) associated with or integral with a second component, via a latch and/or pin in conjunction with a corresponding aperture, etc. are possible.

Continuing with the description of FIGS. 4A-4C and 5A-5C, the portion of the adjustment mechanism 81 that is disposed within the housing can include a notched or tooth structure (e.g., notches 94 as illustrated in FIG. 4C) that is configured to interface with (interference fit with) a corresponding notched or tooth structure (e.g., notches 92 as illustrated in FIG. 4C) on the carriage 80. Hence, rotation of the rotatable lever or rotatable wheel in a given direction (e.g., in the direction 73) and be translated via the interface between the corresponding notched or tooth structures to impart longitudinal movement (e.g., in the direction 75) of the carriage 80. For instance, rotation of the wheel or lever in a first direction can impart movement of the carriage 80 longitudinally toward the first extending structure 30, while rotation of the wheel or lever in a second direction (opposing the first direction) can impart movement of the carriage 80 longitudinally away from the first extending structures 30. Thus, rotation of the lever or wheel permit a user to readily adjust that distance 31 between the first extending structure 30 and the second extending structure 40.

For instance, the lever can rotate from a first position (at a first end of the slot extending through the first end of the housing), as illustrated in FIG. 4A, to a second position at a second end of the slot extending through the first end of the housing 20 that is opposite the first end of the slot), as illustrated in FIG. 4B. Similarly, the wheel can include a curvilinear slot 91 extending within a portion of the wheel. In such instances, a first end or portion of another peg or projection element (not shown) can be disposed within the curvilinear slot 91 and a second end of the peg or projection can be fixable coupled to the housing 20 such that the peg or projection can limit the degree of rotation of the wheel. For instance, the wheel can be configured to move between a first position (where the peg or projection is located at a first end of the curvilinear slot), as illustrated in FIG. 5A, to a second position (where the peg or projection is located at a second end of the curvilinear slot opposite the first end of the curvilinear slot, as illustrated in FIG. 5B.

In some embodiments, a spring or other mechanism can disposition the carriage 80 of any one of the devices 10, 11, 12, or 13 to given position. When present, the dispositioning mechanism can be coupled to the carriage 80 or the adjustment mechanism. For instance, the dispositioning mechanism can be a spring that is directly coupled to the carriage 80 (e.g., having one end coupled to the carriage and another end coupled to the housing), among other possibilities. Similarly, in some embodiments the dispositioning mechanism can be a spring. The disposition mechanism (not shown) can be configured to disposition the carriage 80 to a longitudinally extended position or can be configured to disposition the carriage to a longitudinally contracted position.

In some embodiments, the carriage 80 can include an elongated slot 98 extending longitudinally along a portion of the length of the carriage 80. In such embodiments, a projection or peg can be configured to be slidably disposed within the elongated slot 98. For instance, the lower lid 20B can include an elongated peg 99 or other shaped protrusion configured to extend into the elongated longitudinal slot 98, as illustrated in FIG. 4C. The presence of the elongated slot 98 and the corresponding protrusion or elongated peg 99 can promote aspects herein such as ensuring that the carriage 80 is configured to translate in a substantially longitudinal direction within the housing 20.

Figure 6:
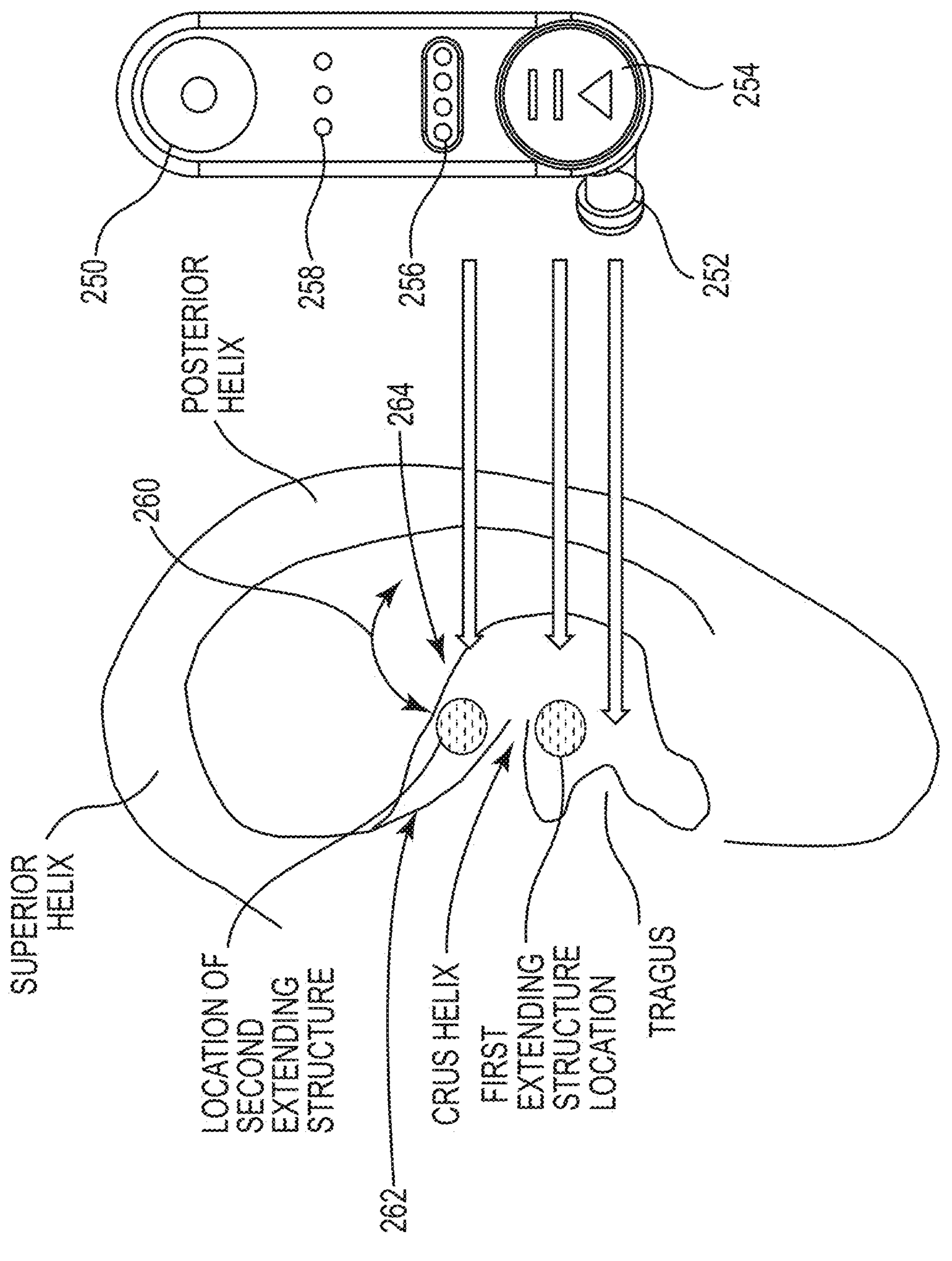
FIG. 6 illustrates placement of a wearable device.

FIG. 6 illustrates placement of a wearable device. The device 250 includes an anchor arm 252. A button 254 is provided for starting or stopping (e.g., pausing) an audio output of the device 250. A tap design, rather than button 254, may be used if desired. Indicator LEDs may be provided at 256 and/or 258. Alternatively, or in addition, the device 250 can include a battery status ring (e.g., the battery status ring 351 as illustrated in FIGS. 8A-8B and 9A-9B, herein). A speaker may be used to provide audible indications of status, such as by inclusion on the anchor arm 252 or elsewhere on the device. Alternatively, or in addition to the battery status ring and/or other controls or indicators depicted on the device 250, a separate device such as a smartphone, tablet, or laptop computer, etc. and/or a special purpose programmer or user device may be coupled in a wired or wireless manner to the device 250. This device may be configured with a software and/or firmware to communicate with the device 250. For instance, the device may be configured to control and/or monitor aspects of the device 250 such as starting, stopping, and/or otherwise modifying operation (e.g., audio output) of the device 250.

The device 250, with anchor arm 252, and a speaker or audio output device as in any of the preceding versions of a wearable device, will be placed as indicated by the arrows. The anchor arm 252 passes behind the tragus, and/or into the auditory canal. This brings the speaker to the position marked speaker location, and the second extending structure to the position marked second extending structure. Such positioning would also put the speaker on/at the conchae caverna, and the second extending structure on/at the conchae cymba. In other examples, the speaker may be differently placed, and/or more than one speaker can be used. Further, rather than or in addition to a speaker, a sensor such as those described herein may be used, as desired, singly or in combinations.

As indicated by line/arrow 260, in several examples the device may be positioned by inserting the anchor arm 252 into the auditory canal, and/or beneath the tragus, and then twisting the device. Some examples may twist the device in a superior/anterior direction, bringing the second extending structure (not shown) into a position abutting the anatomy of the exterior of the ear, such as a superior portion at the posterior edge of the crus helix, marked at 262. This positions the housing more vertically in the ear, with the end opposite the anchor arm 252 near the superior helix. Other examples twist in the opposite direction, in an inferior/posterior direction, bringing the second extending structure (again, not shown) into a position abutting the anatomy of the exterior of the ear, such as the antihelix, as indicated at 264. Whether the device is twisted or not, once placed within the ear, expansion of the extending structures creates force between portions of the boundary of the cavum (ear canal, tragus, and antitragus) against portions of the boundary of the cymba (helix, crus of helix, and antihelix) to secure the device within the ear.

This twisting step highlighted at 260 works the device into a desired position, and can be performed by the user in a simple, quick installation step. In some examples, no molding, curing or reshaping is needed. Because the second extending structure has a variable length, such as by including therein a resilient member or spring, such twisting allows the device to more or less automatically achieve a desirable position in which the speakers or sensor(s) are positioned against or proximate to the user's skin. An adhesive strip, such as tape or other substrate material, can be added if needed to maintain device positioning, however it is envisioned that an additional piece of tap will not be needed for most users, again simplifying the use of the system for the user.

Optionally, if a clip is used, the clip would pass over the helix, for example at a superior or posterior location, or elsewhere and/or in-between, to hold the device in place. Optionally, if tape is used, the tape may extend to and over the region marked superior helix, extend to and over the region marked posterior helix, or elsewhere.

Regardless of the optional clip or tape inclusion, the device 250, using the anchor arm 252 and the extending structures described herein, is configured for placement such that the entire device, in some examples, is positioned inside the periphery of the ear, with no wires extending therefrom. In some examples, only a single device 250 is present in the system, omitting a second device positioned on the other ear. The device 250 may be configured for positioning on the left ear, as may be inferred from FIG. 6. Alternatively, the device may be configured for positioning on the right ear, if desired.

Some examples may include two devices 250 that are separately positioned, without mechanical/electrical contact therebetween, one for each ear of a user. For such as "two-device" system, audio output can be delivered independently by a respective speaker located in each device, in some examples. In other examples, may be coordinated such as by providing wireless communication circuitry in each device so that the two devices can communicate with one another to coordinate audio delivery, or so that each device can communicate with another device such as a user's smartphone (operating an application specific to the system) that communicates with each device to synchronize or coordinating audio delivery.

Figure 7:
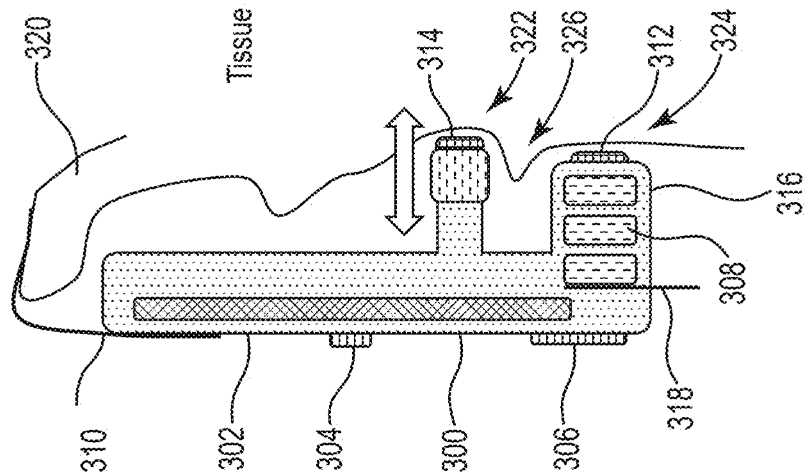
FIG. 7 is a side section view illustrating speaker positioning in the ear.

FIG. 7 is a side section views illustrating mechanisms for securing a wearable device to the ear. In FIG. 7, a device 300 is shown secured to the user's ear. Due to the capability of the devices herein to vary a length thereof (e.g., a variable length between the first and second extending members), in some embodiments the wearable devices herein can be secured to the user's ear in the absence of another element (e.g., tape or other type of additional element). However, in some embodiments, tape or another type of adhesive element can optionally be attached to the device 300 and the superior helix 320 to promote retention of the wearable device in the ear. In some embodiments, the device is sized and shaped so that when positioned as shown, the first extending structure 330 is positioned at the conchae caverna 324, and the second extending structure 340 rests against tissue at the conchae cymba 322. The positioning can also be characterized as having the first extending structure 330 and second extending structure 340 positioned on opposing sides of the crus of helix 326. As mentioned, the first extending structure 330, the second extending structure 340, or both, can include an audio output device. For instance, a speaker 314 can be located on or near an end of the second extending structure 340, as illustrated in FIG. 7. In some embodiments, the speaker 314 can be located on or near the end region the second extending structure 340 and a sensor 312 such as those described herein can be on or near the end of the first extending structure 330, as illustrated in FIG. 7. Alternatively or in addition, another audio output device (e.g., a speaker) and/or another sensor can be located at a different location in the devices herein. Due to the capability of the devices herein to vary a length thereof, in some embodiments the wearable device can be secured to the ear without any of an additional anchor arm, clip, and adhesive tape. In such embodiments, the devices herein can be characterized in part by an absence of each of anchor arm (e.g., a C-shaped or other shaped protrusion configured to extend around a portion of an ear), clip, and adhesive tape.

Illustratively, and without limitation to a particular layout, the device 300 is shown having a printed circuit board 302 therein, coupled by feedthrough or other wires (not shown) to the alert indicators 304, on/off/pause button 306, sensor 312 and an audio output device (e.g., speaker) 314. A stack of battery cells 308, which may be standard button cells or may be a custom design, is contained in this example in the first extending structure 316. Other layouts and battery types can be used; any number of battery cells may be used, though it is expected generally that one to three cells would be used. The device may be a single use device (where single use means use for a single user for a limited period of time e.g., up to one month, or up to fifteen days, for example, and/or where single use indicates the batteries 308 are not replaceable). In other examples, the device may have rechargeable or replaceable batteries 308 and is adapted for repeated use. A removeable tab 318 may be used to preserve battery capacity prior to use; once the tab 318 is removed, the electrical circuit for powering the device is completed and the device electronics are enabled. In some examples, an optical light pipe such as an optical fiber may be used to transmit light from LEDs on the circuit board 302 to desired positions, for instance for use on the indicators.

FIG. 89 provides an illustrative example of status and warning lights. The illustrative device 350 can correspond to any of the devices 10, 11, 12, and/or 13 described herein. Alert indicators (lights typically) can include power indicators (e.g., on/off indicators), connectivity (e.g., WI-FI and/or BLUETOOTH) indicators, and/or or a low battery alert 354. Other alerts and mechanisms for interaction with the user may be used. A digital screen can be used if desired instead of discrete alert lights.

The multi-purpose light emitting diode ring 351 can be configured to indicate battery health or status and/or other aspects of device operation by illuminating, flashing, and/or turning off some or all the progress lights segments which comprise the ring. For instance, the multi-purpose light emitting diode ring 351 can be configured to incrementally indicate an incremental reduction in battery charge by flashing or illuminating an individual segment to indicate that corresponding battery charge level. For example, the multi-purpose light emitting diode ring 351 can be configured to incrementally indicate a battery charge level by turning off the individual segment corresponding to a range of battery charge levels (e.g., from 100 percent to 75 percent charged) responsive to the battery charge being reduced to a battery charge level (e.g., 73 percent0 that is less than the range of battery charge levels and flashing a subsequent individual segment to indicate that the battery charge level is within a subsequent (lower) battery charge level during a subsequent corresponding segment of time, as detailed herein. However, other mechanisms to indicate battery charge level and/or device status/operation (e.g., changing a color, varying an intensity, etc. of the status lights can be utilized alternatively or additional to indicate device status and/or battery charge level.

The multi-purpose light emitting diode ring 351 can be configured in a in a clock-like circular pattern to indicate battery charge level and/or can include device status indicators. For example, the progress ring can be formed of various segments representative of distinct portions or ranges of battery charge levels. For instance, as illustrated in FIGS. 8A-8B and 9A-9B the ring 351 can have four light segments 352A, 352B, 352C, 352D (collectively referred to herein as light segments 352). The light segments 352 can correspond to a range of respective battery charge levels (e.g., each segment corresponds to a about 25 percent of an overall battery charge level). A liquid crystal display, touch-screen, or other display may be used instead of the ring 351, if desired.

Figure 9:
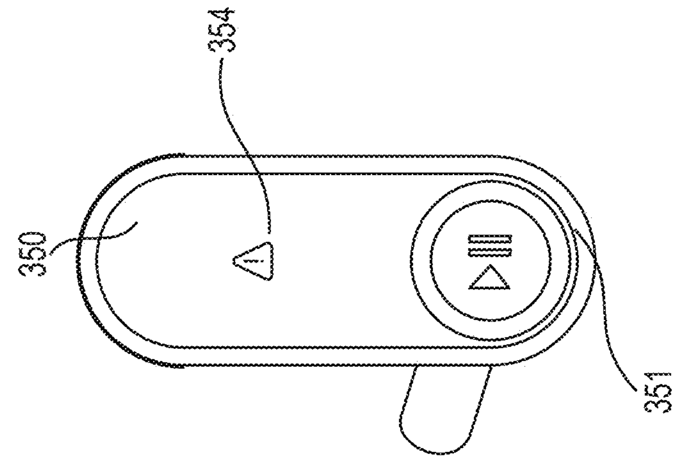
FIG. 9 shows an illustrative example of status and warning lights.
Figure 8:
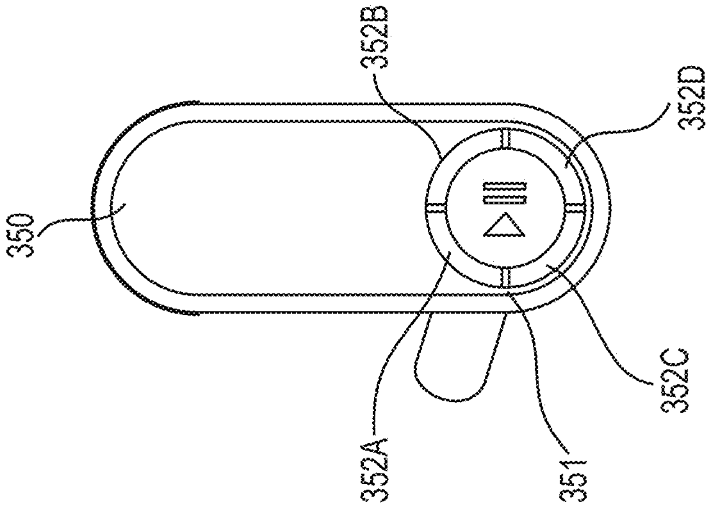
FIG. 8 shows an illustrative example of status and warning lights.

As illustrated in FIGS. 8-9, the device 350 can include one or more alert lights that can be selectively displayed or illuminated. Alert lights may include, for example, lights that indicate problems with the device, which may include poor contact with the skin (determined for example using a temperature sensor or an impedance monitor, as desired) when the device includes a sensor such as the sensor 312 in FIG. 7, expiration of the device, other failure in the device, low battery, etc. A button may be used to initiate or pause the audio output, as desired. As illustrated in FIGS. 8-9, the status ring 351, the light segments 352, and/or the alert lights 354 can be located on an exterior surface (e.g., an exterior surface of the first molded piece 20A, as described herein) of the device 350. Having the status ring 351, the light segments 352, and/or the alert lights 354 be located on the exterior surface of the device can promote aspects herein such as permitting access to and/or permitting the status ring 351, the light segments 352, and/or the alert lights 354 to be readily viewed (e.g., be visible) even when the device is positioned in in an ear of a user). However, the quantity, the type, and/or the location of the status ring 351, the light segments 352, and/or the alert lights 354 can be varied.

Figure 10:
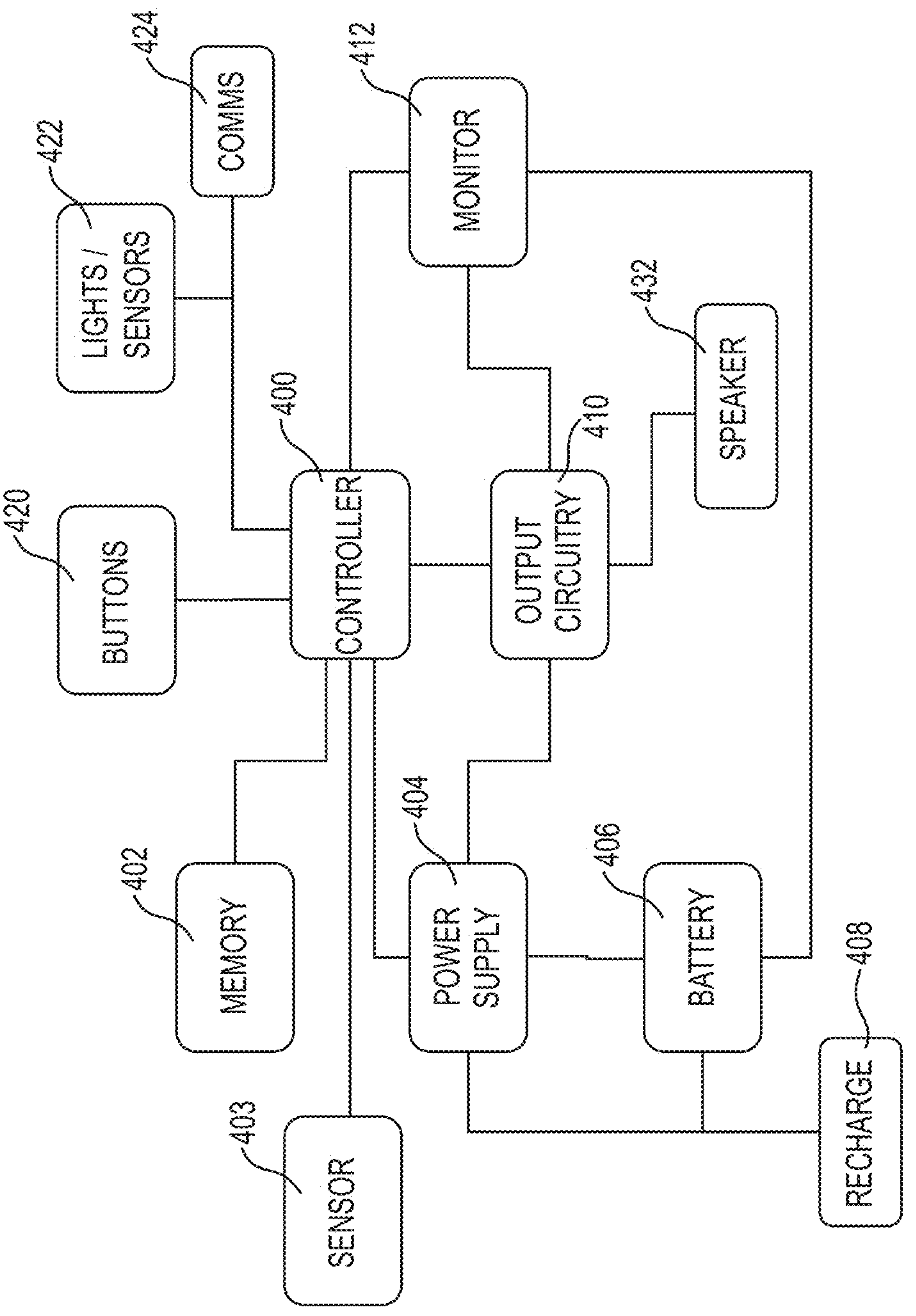
FIG. 10 is a block diagram for illustrative circuitry.

FIG. 10 is a block diagram for illustrative circuitry. The illustrative circuitry may be described as operational circuitry for the device, and would be contained in the housing as shown in any of the preceding examples. The device includes a controller 400. The controller 400 may take many forms, including, for example, a microcontroller or microprocessor, coupled to a memory 402 storing readable instructions for performing methods as described herein, as well as providing configuration of the controller for the various examples that follow. The controller 400 may include one more application-specific integrated circuits (A SIC) to provide additional or specialized functionality, such as, without limitation, a signal processing ASIC that can filter received signals from a sensor 403 such as those described herein using digital filtering techniques. Logic circuitry, state machines, and discrete or integrated circuit components may be included as well. A controller 400 may take the form of a state machine, if desired. The skilled person will recognize many different hardware implementations are available for a controller. Likewise, the memory 402 can take any suitable form, including Flash memory, combinations of multiple memory types, etc.

The operational circuitry also includes a power supply block 404, coupled to a battery 406. The power supply block may include voltage step-up or step-down circuitry, or may include appropriate regulators, converters and the like, as well as smoothing circuitry as needed/desired to obtain power from a battery 406 and provide power at specified voltage/current for use in the controller 400 as well as the output circuitry shown at 410. One, two, three, four or more battery cells may form a battery 406; commercial off-the shelf button-type batteries may be used, or specialized versions may be developed and used. For example, three or four lithium-chemistry button batteries may provide 9 or 12 volts of power supply, allowing maximum currents in the device to stay relatively small (reducing heat), while generating sufficient headroom to provide desired current or voltage levels for therapy. Batteries may be replaceable, if desired. Rechargeable batteries could be used, whether removeable and rechargeable or by providing a recharging circuit as indicated at 408, in the device, where power can be transferred to a recharging circuit by use of an electrical port on the device, or by wireless transmission (inductive, RF, ultrasonic, etc.) to a transducer on or inside the device. An example may use an inductive loop coupled to a rectification circuit that in turn delivers current/power to the battery 406 for recharging, for example. A recharging case or cord, for example, can be used to enable recharging of the device or devices. Some examples may include electrical contacts on the device for recharging in a recharging case/housing, if desired.

The power supply 404 may further include a dedicated voltage converter to provide, for example, a source for a current controlled output circuitry. In an example, an inductive or capacitive step-up circuit is used to store a 60-volt amplitude on one or more capacitors to provide headroom for a current controller output circuit using, for example, one or more current mirrors to control the output current. Suitable amplifier-based circuits may be used, instead, or any other desired circuit can be used. While inductive step-up circuitry can be used, capacitive converter designs may provide better MRI-compatibility and tend to be smaller and introduce less weight.

The output circuitry 410 may include a set of switches, such as an H-Bridge circuitry design, configured to provide alternating signal outputs. Square wave outputs may be used, and may be current controlled or voltage controlled, as desired. Non-square waves can be used as well, such as exponentially decaying, sinusoidal (in which case a resonant circuit can be included), triangle, ramped, etc. The power supply 404 is configured to provide voltage step-up (such as a voltage multiplier using inducive or capacitive elements), allowing the output circuitry to shape and control the power signals issued to the transducer 432. The transducer 432 may also receive control signals from the controller 400 to manage, for example, output frequency of the transducer, depending on design.

The monitoring circuitry 412 can include one or more sensors such as those described herein. For example, the monitoring circuitry can be manifested as a temperature sensor (such as a thermistor, resistance temperature detectors, thermocouples, and/or integrated circuit sensors) to monitor temperature at the tissue interface.

The monitoring circuitry 412 may also monitor battery status, including, for example, a current sensor or coulomb counter if desired to track actual battery use, or a voltage sensor to determine open, lightly loaded, or loaded output voltage of the battery 406 or individual cells therein. Battery usage may instead be tracked, for the purpose of determining battery end of life/status, by the controller 400 using timers, etc., as desired.

The memory 402 may store controller-readable instructions for operating the device in any suitable form, and can also store operating data, including time spent in pause, on/off or other operational data. Operational data may include temperature or impedance data, if desired, or any other sensed parameters or signal.

The controller is also coupled to what may be termed input-output devices, including any buttons 420 on the device, sensors, and/or lights 422 described herein. A screen or touchscreen may be used instead or as well as those items shown. Some systems may optionally include an RF circuit block 424, including, for example and without limitation, Bluetooth, WiFi, and/or any wireless communications circuitry (antenna, driver, crystal/resonator, etc.) for performing wireless communication with a separate device. For example, a smartphone operating an application may communicate via Bluetooth with the device to control any characteristic of device operation (duration, on/off, repetition rate, amplitude, pulse width, type, etc.) and/or to obtain device operational data (usage, battery status, etc.).

General purpose devices may communicate with the system if desired, using for example an application operating on a smartphone, tablet, or computer.

Communication may be used to modify settings, upload new software to the device, and/or to download device and/or application usage data or other usage data. Device status, such as battery capacity, may be communicated. Communication may also be used to turn the device on or off, if desired, rather than relying on a button or other actuatable component on the device and/or device housing.

Figure 11:
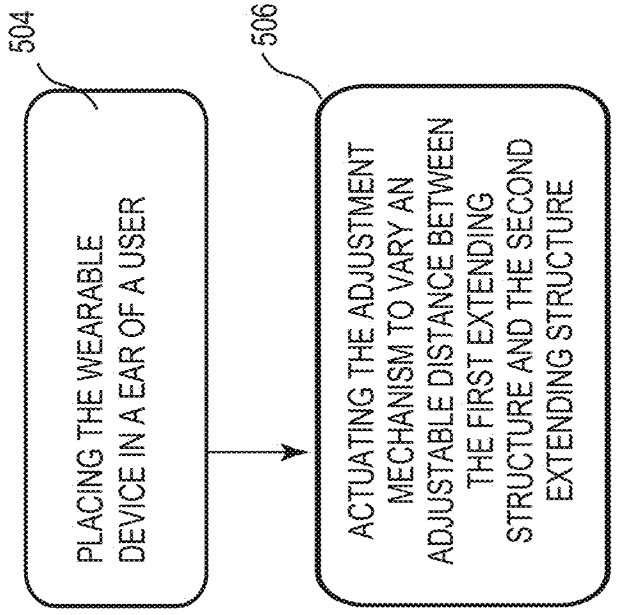
FIG. 11 show a block process flow diagram of an illustrative method.

FIG. 11 shows a block process flow diagram of an illustrative method. A relatively comprehensive method is shown; some other or alternative examples may omit one or more blocks/steps, or may replace the illustrative steps shown with other steps. For instance, the methods herein can additional include adjusting the actuating the adjustment mechanisms to vary an adjustable distance between the first extending structure and the second extending structure until the second extending structure abuts the helix, the antihelix, the inferior crus, or any combination thereof, as described herein. For example, the method can include placing the anchor arm in the auditory canal or at least partially beneath the tragus, as indicated at 504. Further, the methods herein can include adjusting the adjustable distance prior to, during, and/or subsequent to placing the devices (e.g., an anchor arm of the devices) in the auditory canal. For example, the adjustment can be performed subsequently to placing the anchor arm in the auditory canal or at least partially beneath the tragus. As mentioned, the adjustment mechanisms herein can be actuated with one or more digits on an individual hand of a user, as indicated at 506. Hence, the adjustment mechanisms herein can permit adjustment with one hand (an individual) hand of a user. The adjustment can be performed by way of rotation or translation of the adjustment mechanism e.g., relative to the housing 20, unlike some device that require pinching or the use of two hands to adjust aspects of a device.

Figure 13:
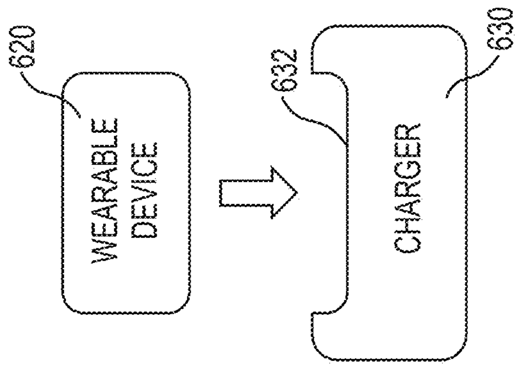
FIGS. 12-13 illustrate wearable devices and charging systems.
Figure 12:
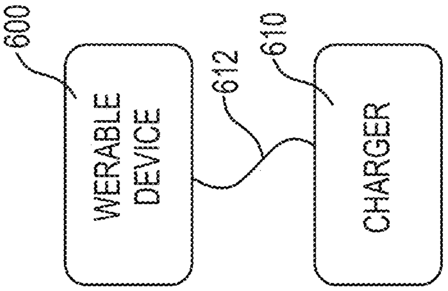

FIGS. 12-13 show wearable devices with chargers. For a user to use a device in a long-term sense, the power supply must be either replaceable (such as with replaceable batteries) or replenishable. A rechargeable wearable device may be useful in any context. In FIG. 12, a wearable device 600 is shown connected to a charger 610 using a wire 612. The connection may use standard connectors, such as uniform serial bus (USB) connectors, micro-USB, etc., or may be a special purpose connector 612 to prevent unauthorized use or modification of the wearable device 600, if desired. The charger 610 may be battery powered or may use wall power, as desired. The wearable device 600 may remain positioned in the ear of a user during charging, or may be removed. Another example is shown at FIG. 13. Here the wearable device 620 is received in a charger 630, having a depression or cradle 632 for receiving the wearable device 620. Electrical connectors can be provided in the cradle 632, positioned to align with electrical connections on the outside of the wearable device 620. Other modes of power transmission can be used, including inductive, RF, optical, etc., as desired.

In each of FIGS. 12-13, data transmission can be performed while charging takes place. For example, firmware in the wearable devices 600, 620 may be updated, or settings modified, as desired. The chargers 610, 630 may be connectable to additional devices, such as a smartphone operating a dedicated application for the purpose of software updating, and/or wearable device operation modification, if desired.

Figure 14:
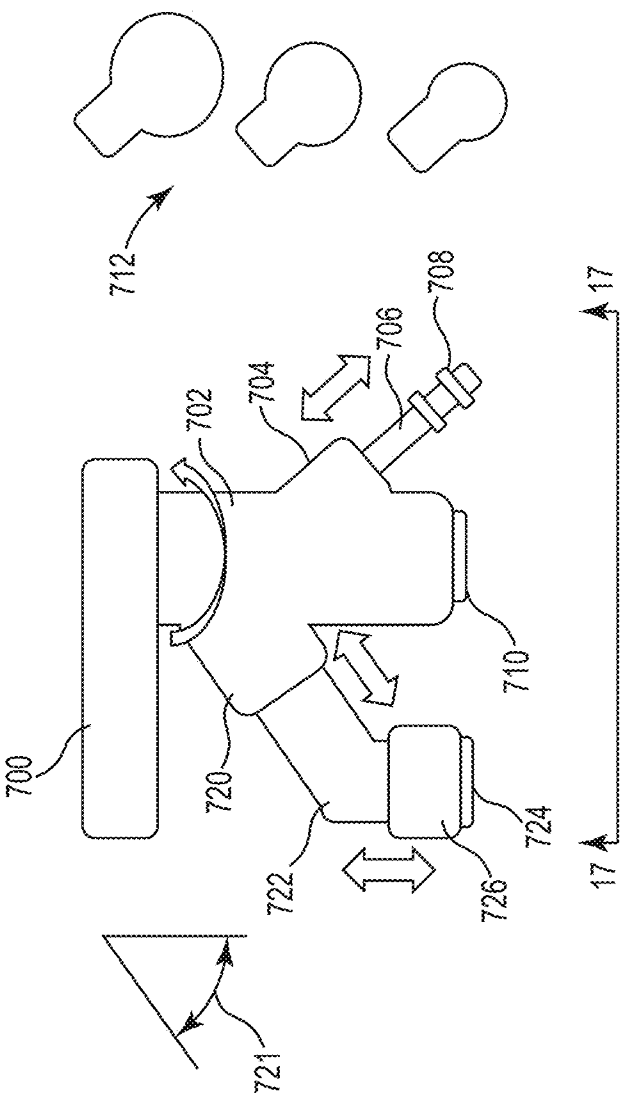
FIGS. 14-15 illustrate further alternative designs for wearable devices.
Figure 15:
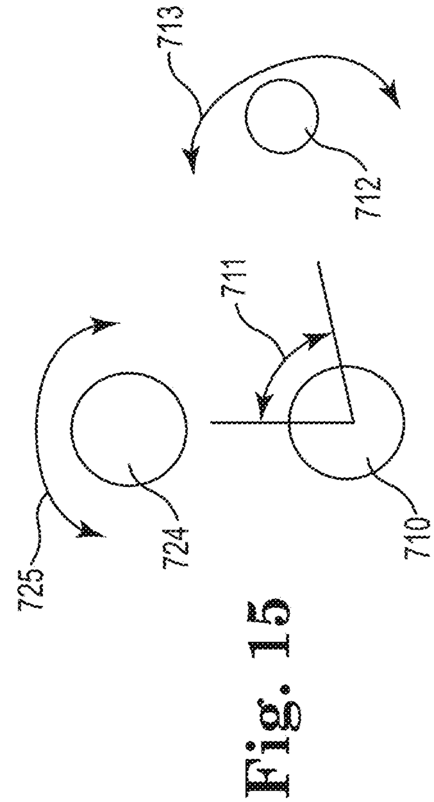

FIGS. 14-15 illustrate further structures. In FIG. 14, a wearable device 700 includes an extending structure 702 which carries an anchor arm 704, having an extending anchor arm 706 moveably mounted therein as indicated by the arrow. Ridges are provided as shown at 708 for holding a removable tip thereon, to anchor in the auditory canal of the user's ear. A speaker is represented by element 710. When the device is placed in an ear, the speaker 710 may be placed in or adjacent to the auditory canal of a user. A plurality of tips 712, in a range of sizes if desired, are provided with the device. Tips 712 may come in various shapes or sizes to allow different users to select a best fit. Tips 712 may be replaceable, as the position in the auditory canal may lead to wax build up, for example, making occasional or periodic replacement useful.

The extending structure 702 also carries an extension 722 which can be extended or retracted relative to a receiver 720, such as by including a spring-loaded structure, as indicated by the arrow. The extension 722 forms an angle 721 relative to the axis of the extending structure 702, the angle being, illustratively, in the range of about 30 to about 60 degrees; in an example, the angle 721 is about 45 degrees. An optional speaker or sensor 724 is positioned on a carrier 726, which may be a generally hollow piece that can slide over the extension 722, as indicated by the arrow. Positioning may again be spring loaded, if desired. This design has a single extending structure 702 relative to the main body of the device 700.

The extending structure 702 may be rotatable (at least partly) if desired, allowing the main body to directed, vertically, horizonal, or at an angle therebetween when placed on the user. For example, if a user is in a recumbent position the rotation of the extending structure may be used to adjust for comfort and secure positioning. In some examples, the receiver 720 is rotatable relative to the anchor arm 704, for example, allowing different angles to be defined therebetween, if desired.

FIG. 15 shows the orientation of speakers or sensors of FIG. 14. It may be noted that FIG. 14 illustrates the location of the anchor arm 706 relative to the extension 722 at an angle so that the extension 722 can be observed in one drawing. FIG. 15 illustrates these angles with a bit more clarity. The speaker 710, along with the optional sensor 724 and the anchor arm at tip 712 form an angle as shown at 711. The positions of speaker 724 and tip 712 are adjustable as illustrated with arcs 713 and 725, so that the angle 711 can be varied in the range of about 60 degrees to about 135 degrees, or more or less. The angle 711 may be, for example, about 90 degrees, if desired. The angle 711 can be adjustable if desired. In some examples, angle 711 is instead a fixed angle.

In some examples, textured, ridged, disk, or bulbous shapes (or combinations thereof) may be used to aid in securing the device in place by including such shapes on the anchor and/or an extending structure. For example, the three elements 710, 712, and 724 shown in FIG. 15 each represent touch points to tissue of a user. Any one, two or all three of these touch points can include a shape (such as bulbous or disk-shape), ridges, texture or roughening that discourages or prevents passage along or past tissue or a tissue ridge or layer, such as the helix, antihelix, helical crus, intertragal notch, tragus, and/or anti-tragus. Such shape, ridges, texture or roughening may be applied on all sides of any of the three touch points, or only along an outer edge or tissue-contacting side thereof, as desired. By outer edge, the intent is to indicate the portion of any anchor or extending structure that would press against tissue to hold the device in a desired position.

Each of the non-limiting examples herein can stand on its own, or can be combined in various permutations or combinations with one or more of the other examples.

The above detailed description includes references to the accompanying drawings, which form a part of the detailed description. The drawings show, by way of illustration, specific embodiments. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." Moreover, in the claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described above. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAM s), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, innovative subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the protection should be determined with reference to the appended claims, along with the full scope of equivalents to which such claims are entitled.

What is claimed is:

1. A wearable device adapted for placement relative to an ear of a user, comprising:

a housing containing electronics and a power source;

a first extending structure having a first end at the housing and a second end apart from the housing, the first extending structure having a first length, the second end configured for contacting the posterior edge of the crus and/or antitragus;

a first anchor arm extending laterally from the first extending structure and carrying an anchor element thereon, the anchor element configured for positioning beneath a tragus of the ear of the user to thereby support positioning of the wearable device;

a second extending structure comprising a first end at the housing and a second end apart from the housing, wherein the first and second extending structures are separated by an adjustable distance;

a carriage coupled to the first end of the second extending structure and being at least partially disposed within the housing, wherein the carriage is configured to move longitudinally along a length of the housing; and an adjustment mechanism coupled to the carriage, wherein the adjustment mechanism is configured to impart a force to cause longitudinal movement of the carriage to adjust the adjustable distance.

2. The wearable device of claim 1, wherein the adjustment mechanism is an individual adjustment mechanism that is configured to be actuated by contact from one or more digits on an individual hand of a person.

3. The wearable device of claim 1, wherein:

the adjustment mechanism is located at a first end of the housing; and a portion of the adjustment mechanisms extends a distance from the first end of the housing and a portion of the adjustment mechanism is located inside of the housing.

4. The wearable device of claim 1 wherein the second extending structure is configured to abut a first portion of an ear to create an opposing force to the first extending structure which is configured to abut a second portion of the ear, wherein the first portion of the ear is the inferior crus, the antihelix, or both, and wherein the second portion of the ear is the antitragus.

5. The wearable device of claim 1, wherein the adjustment mechanism is integral with the carriage.

6. The wearable device of claim 5, wherein the adjustment mechanism is located on a first end of the carriage, and wherein the adjustment mechanism comprises a protrusion extending radially from the carriage.

7. The wearable device of claim 5, wherein a speaker, a sensor, or both the speaker and the sensor are positioned on the first extending structure or the second extending structure.

8. The wearable device of claim 1, wherein the adjustment mechanism comprises a separate component that is coupled to the carriage.

9. The wearable device of claim 8, wherein the adjustment mechanism further comprises a rotatable adjustment mechanism including an annulus, wherein the rotatable adjustment mechanism is configured to rotate about the annulus relative to the carriage, the housing, or both the carriage and the housing.

10. The wearable device of claim 9, wherein:

the housing includes a slot extending through the first end of the housing;

the rotatable adjustment mechanism comprises:

a lever extending laterally therefrom through the slot to a position outside of the housing; and teeth disposed along at least a portion of a periphery of the rotatable adjustment mechanism that is located in the housing; and the carriage includes corresponding teeth that are configured to interface with the teeth to impart the longitudinal movement of the carriage responsive to rotation of the lever.

11. The wearable device of claim 10, wherein:

the carriage includes an elongated longitudinal slot extending along a portion of the length of the carriage; and the housing includes a peg configured to extend into the elongated longitudinal slot.

12. The wearable device of claim 9, wherein:

the housing includes a slot extending through the first end of the housing; and the rotatable adjustment mechanism comprises a wheel with a toothed surface along at least a portion of a periphery of the rotatable adjustment mechanism and a curvilinear slot extending within a portion of the wheel.

13. A wearable device adapted for placement relative to an ear of a user, comprising:

a housing containing, electronics and a power source, wherein the housing comprises a lower container and an upper lid defining a cavity therebetween;

a first extending structure having a first end at the housing and a second end apart from the housing, the first extending structure having a first length, the second end configured for contacting the posterior edge of the crus and/or antitragus;

a first anchor arm extending laterally from the first extending structure and carrying an anchor element thereon, the anchor element configured for positioning beneath a tragus of the ear of the user to thereby support positioning of the wearable device;

a second extending structure comprising a first end at the housing and a second end apart from the housing, wherein the first and second extending structures are separated by an adjustable distance;

a carriage coupled to the first end of the second extending structure and being at least partially disposed within the cavity of the housing, wherein the carriage is configured to translate longitudinally along a portion of a length of the housing;

an adjustment mechanism coupled to the carriage, wherein the adjustment mechanism is an individual adjustment mechanism that is configured to impart a force to cause longitudinal translation of the carriage to adjust the adjustable distance; and a speaker positioned on the first extending structure or the second extending structure.

14. The wearable device of claim 13, wherein:

the adjustment mechanism comprises a fixed protrusion extending radially from the carriage or a rotatable adjustment mechanism coupled to an end of the carriage; or the carriage, the housing, or both the carriage and the housing include detents configured to predispose the carriage to one or more longitudinal positions along a length of travel of the carriage.

15. The wearable device of claim 14, wherein the first extending structure is located on a first side of the housing, a second side of the housing opposite the first side comprises at least one control button or switch for controlling activity of the electronics, and wherein the second extending structure is configured to abut a first portion of an ear to create an opposing force to the first extending structure which is configured to abut a second portion of the ear, wherein the first portion of the ear is the inferior crus, the antihelix, or both, and wherein the second portion of the ear is the antitragus.

16. The wearable device of claim 13, wherein a sensor is positioned on the first extending structure or the second extending structure.

17. A method of positioning a wearable device in an ear of a user, the wearable device comprising a housing and a first extending structure carrying thereon an anchor arm adapted for positioning in the auditory canal of a user, a second extending structure spaced from the first extending structure, a carriage coupled to the second extending structure, and an adjustment mechanism disposed at a first end of the housing and being configured to adjust a distance between the second extending structure and the first extending structure by imparting a force on the carriage to cause longitudinal movement of the carriage, the method comprising:

placing the anchor arm in the auditory canal or at least partially beneath the tragus; and actuating the adjustment mechanisms to vary an adjustable distance between the first extending structure and the second extending structure until the second extending structure abuts the helix, the antihelix, the inferior crus, or any combination thereof.

18. The method of claim 17, wherein actuating the adjustment mechanism further comprises actuating the adjustment mechanism with one or more digits of an individual hand of a user subsequent to placing the anchor arm in the auditory canal or at least partially beneath the tragus.

19. The method of claim 17, wherein a speaker, a sensor, or both the speaker and the sensor are positioned on the first extending structure or the second extending structure.

20. The method of claim 19, wherein a speaker is positioned on the first extending structure, the second extending structure, or both the first extending structure and the second extending structure.

* * * * *